(12) United States Patent
Bolger

(10) Patent No.: US 10,753,348 B2
(45) Date of Patent: Aug. 25, 2020

(54) APPARATUSES AND SYSTEMS FOR CONVERTING FLUID ENERGY TO MECHANICAL MOTION

(71) Applicant: David V. Bolger, Aurora, IL (US)

(72) Inventor: David V. Bolger, Aurora, IL (US)

( * ) Notice: Subject to any disclaimer, the term of this patent is extended or adjusted under 35 U.S.C. 154(b) by 1272 days.

(21) Appl. No.: 14/986,686

(22) Filed: Jan. 3, 2016

(65) Prior Publication Data

US 2016/0195179 A1    Jul. 7, 2016

Related U.S. Application Data

(60) Provisional application No. 62/100,026, filed on Jan. 5, 2015, provisional application No. 62/274,248, filed on Jan. 2, 2016.

(51) Int. Cl.
| | |
|---|---|
| *F04B 35/01* | (2006.01) |
| *F03G 7/00* | (2006.01) |
| *F15B 5/00* | (2006.01) |
| *F15B 7/00* | (2006.01) |
| *F16H 19/04* | (2006.01) |

(Continued)

(52) U.S. Cl.
CPC ............ *F04B 35/01* (2013.01); *F03G 7/00* (2013.01); *F15B 5/00* (2013.01); *F15B 7/00* (2013.01); *F16H 19/04* (2013.01); *F16H 47/02* (2013.01); *F03G 7/10* (2013.01); *F15B 2215/00* (2013.01); *F15B 2215/30* (2013.01)

(58) Field of Classification Search
CPC .......... F04B 35/01; F16H 19/04; F16H 47/02; F15B 5/00; F15B 7/00; F15B 2215/00; F15B 2215/30; F03G 7/00; F03G 7/10

USPC ...... 60/200.1, 201, 221, 222, 228, 325, 767, 60/721; 415/916
See application file for complete search history.

(56) References Cited

U.S. PATENT DOCUMENTS 3,024,602 A * 3/1962 Bertin ...................... F02K 1/32
                                               239/265.17
3,422,726 A    1/1969 Gottlieb
(Continued)

FOREIGN PATENT DOCUMENTS

| JP | 11-30362 A | 11/1999 |
|---|---|---|
| KR | 10-1999-0059458 A | 7/1999 |

OTHER PUBLICATIONS

International Search Report issued in co-pending International Application No. PCT/US2016/012037, ISA/KR, dated Mar. 29, 2016, 3 pages.

(Continued)

*Primary Examiner* — Hoang M Nguyen
(74) *Attorney, Agent, or Firm* — McDonnell Boehnen Hulbert & Berghoff LLP

(57) ABSTRACT

An example apparatus includes: a plate configured to move along an underlying surface via a layer of fluid disposed in a gap between the plate and the underlying surface, where pressurized fluid forms the layer of fluid in the gap; a first rack gear coupled to the plate and meshing with a first gear; and a second rack gear coupled to a second gear. The second rack gear is fixed, and the second gear is coupled to the first gear. The pressurized fluid in the gap repels the plate away from the underlying surface, thereby causing (i) the first rack gear to move linearly and the first gear to rotate, (ii) the second gear to rotate and move along the second rack gear, and (iii) the plate to move along the underlying surface.

28 Claims, 32 Drawing Sheets

(51) Int. Cl.
*F16H 47/02* (2006.01)
*F03G 7/10* (2006.01)

(56) References Cited

U.S. PATENT DOCUMENTS

| | | | |
|---|---|---|---|
| 3,743,451 A | | 7/1973 | Chapman |
| 3,870,437 A | | 3/1975 | Gondek |
| 3,877,442 A | | 4/1975 | Miller |
| 4,392,060 A | | 7/1983 | Ivy |
| 4,496,846 A | | 1/1985 | Parkins |
| 6,012,862 A | * | 1/2000 | Nakano ................. B41J 13/106 400/625 |
| 7,768,143 B2 | | 8/2010 | McCague et al. |
| 7,948,107 B2 | | 5/2011 | Fraenkel |
| 2004/0011924 A1 | * | 1/2004 | Robinson ............... B64G 1/409 244/62 |
| 2010/0283261 A1 | * | 11/2010 | Ryan ....................... F03B 17/04 290/1 R |
| 2012/0025543 A1 | * | 2/2012 | Gilbert, Jr. ........... H02K 7/1807 290/1 C |
| 2013/0043684 A1 | * | 2/2013 | Shinohara ............. F03B 17/025 290/54 |
| 2013/0251499 A1 | | 9/2013 | Rampen |

OTHER PUBLICATIONS

Written Opinion issued in co-pending International Application No. PCT/US2016/012037, ISR/KR, dated Mar. 29, 2016, 6 pages.

* cited by examiner

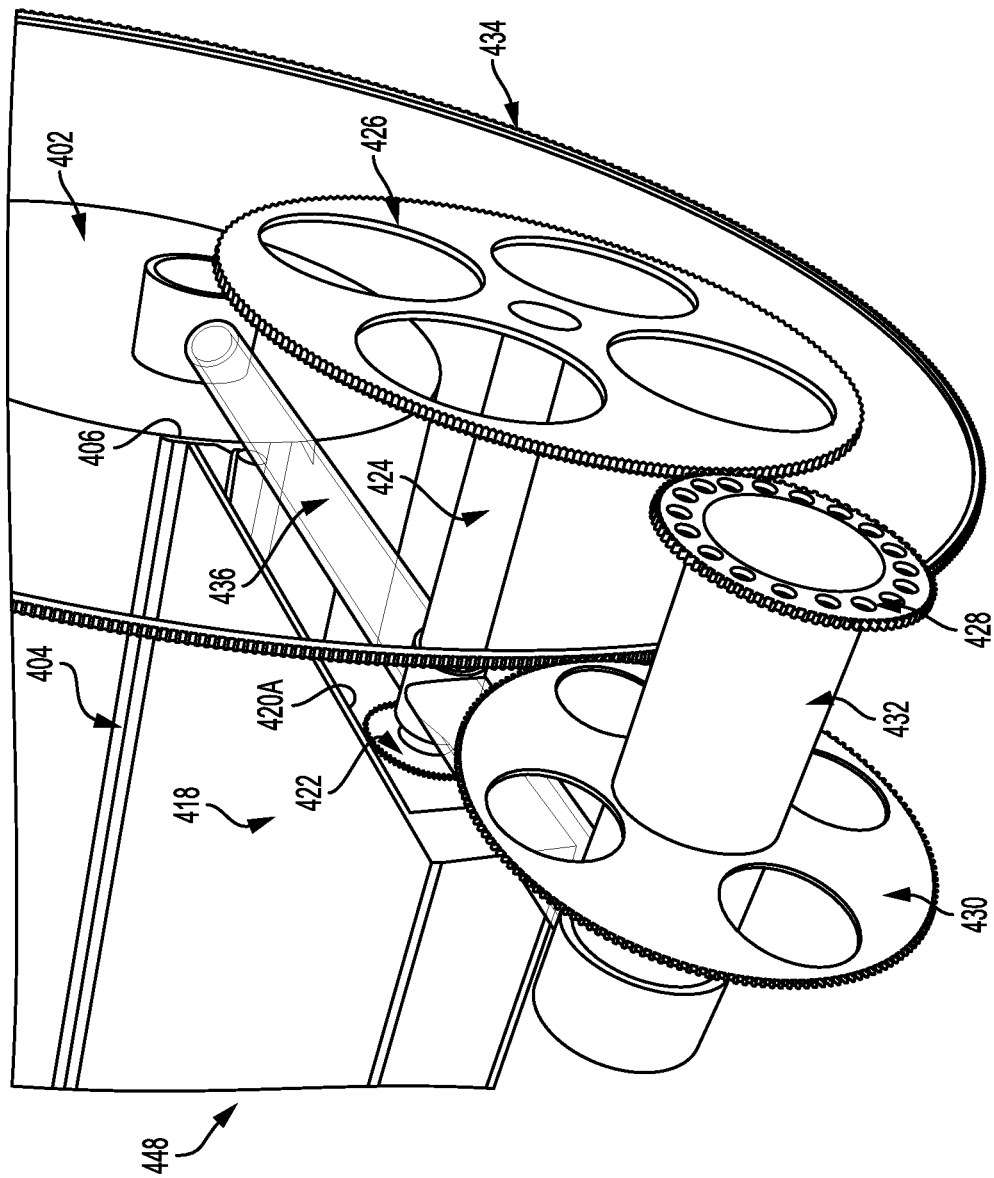

APPARATUSES AND SYSTEMS FOR CONVERTING FLUID ENERGY TO MECHANICAL MOTION

CROSS REFERENCE TO RELATED APPLICATION

The present application claims priority to U.S. Provisional patent application Ser. No. 62/100,026, filed on Jan. 5, 2015, and entitled "Power Generating Device," and U.S. Provisional patent application Ser. No. 62/274,248, filed on Jan. 2, 2016, and entitled "Power Generating Device," both of which are herein incorporated by reference as if fully set forth in this description.

BACKGROUND

Fluid power systems involve using fluid under pressure to generate, control, and transmit power. The fluid in such systems could be a liquid such as mineral oil or water, or could be a gas such as air or other gases. In examples, the fluid could be pressurized by a pump. Pressurized fluid can be used to transmit power. For instance, energy of pressurized fluid could be converted to mechanical energy.

SUMMARY

The present disclosure describes implementations that relate to apparatuses and systems for converting fluid energy to mechanical motion. In a first example implementation, the present disclosure describes an apparatus. The apparatus includes a plate configured to move along an underlying surface via a layer of pressurized fluid disposed in a gap between the plate and the underlying surface. The apparatus further includes a first rack gear coupled to the plate and meshing with a first gear, where the first rack gear is movable with the plate. The apparatus also includes a second rack gear meshing with a second gear, where the second rack gear is fixed, and where the second gear is coupled to the first gear. The pressurized fluid in the gap repels the plate away from the underlying surface, thereby causing (i) the first rack gear to move linearly and the first gear to rotate, (ii) the second gear to rotate and move along the second rack gear, and (iii) the plate to move along the underlying surface.

In a second example implementation, the present disclosure describes an apparatus. The apparatus includes a plate configured to rotate about an underlying surface of a cylindrical drum via a layer of pressurized fluid disposed in a gap between the plate and the underlying surface. The apparatus further includes a rack gear coupled to the plate and meshing with a first gear. The rack gear is configured to rotate with the plate as the plate rotates about the underlying surface of the cylindrical drum. The apparatus also includes a ring gear coupled to a second gear. The ring gear is fixed and has external teeth meshing with teeth of the second gear, and the second gear is coupled to the first gear. The pressurized fluid in the gap repels the plate away from the underlying surface of the cylindrical drum, thereby causing (i) the rack gear to extend away from the underlying surface and the first gear to rotate, (ii) the second gear to rotate and move along the ring gear, and (iii) the plate, the rack gear, the first gear, the second gear to rotate about the underlying surface.

In a third example implementation, the present disclosure describes an apparatus. The apparatus includes a first disk having a hole disposed therein. A portion of the first disk that includes the hole is exposed to pressurized fluid. The apparatus also includes a first shaft coupled to a center of the first disk, and a second disk disposed in the hole of the first disk. The apparatus further includes a first rack gear coupled to the second disk at a first end of the first rack gear, and configured to mesh with a first gear at a second end of the first rack gear. The apparatus also includes a second gear coupled to the first gear via a second shaft. The second gear is configured to rotate with the first gear at a particular speed, and the second shaft is configured to couple the first gear and the second gear to the first shaft. The apparatus further includes a second rack gear meshing with the second gear. The second rack gear is fixed. The pressurized fluid repels the second disk disposed within the first disk, thereby causing (i) the first rack gear to move linearly and the first gear to rotate, (ii) the second gear to rotate and move along the second rack gear that is fixed, and (iii) the shaft and the first disk coupled thereto to rotate.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 4F illustrates another perspective view of the apparatus as shown in FIG. 4D, in accordance with an example implementation.

DETAILED DESCRIPTION

The following detailed description describes various features and functions of the disclosed systems and methods with reference to the accompanying figures. The illustrative system and method embodiments described herein are not meant to be limiting. It may be readily understood that certain aspects of the disclosed systems and methods can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

I. OVERVIEW

Fluid energy could be converted into mechanical motion via applying pressure on a surface, causing the surface to move while expanding a volume of the fluid acting on the surface. For example, several hydraulic actuators operate based on such principle of fluid volume expansion.

Figure 1A:
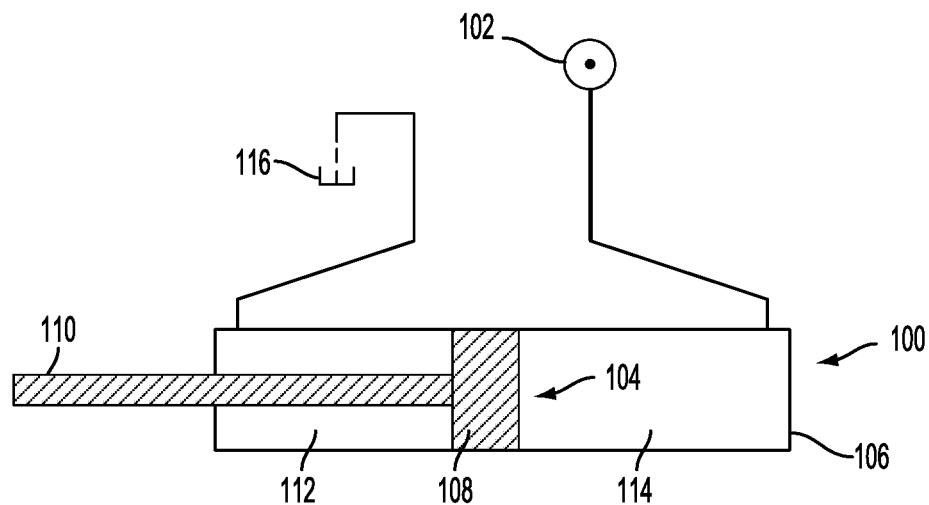
FIG. 1A illustrates a hydraulic actuator, in accordance with an example implementation.

FIG. 1A illustrates a hydraulic actuator 100, in accordance with an example implementation. FIG. 1A illustrates a high pressure fluid source 102 configured to provide pressurized fluid to the actuator 100. The high pressure fluid source 102 may be, for example, a pump, an accumulator, or a reservoir containing fluid at greater than atmospheric pressure. Fluid at the bottom of such a container may have a pressure head, which is the internal energy of a fluid due to the pressure exerted on its container. Other ways of pressurizing fluid are also possible.

The actuator 100 includes a piston 104 slidably accommodated within a cylinder 106 of the actuator 100. The piston 104 includes a piston head 108 and a rod 110 extending from the piston head 108 along a central axis direction of the actuator 100. The piston head 108 divides the inside of the cylinder 106 into two chambers, 112 and 114.

As the source 102 provides pressurized fluid to the chamber 114, the pressurized fluid applies pressure on a surface of the piston 104, or more particularly, on a surface of the piston head 108. This pressure may cause the piston 104 to extend (i.e., move left in FIG. 1A). A hydraulic system such as the system shown in FIG. 1A may include other components that are not shown such as valves regulating flow of fluid to and from the actuator 100. Valves and other components are not shown in FIG. 1A to reduce visual clutter in the drawings.

Figure 1B:
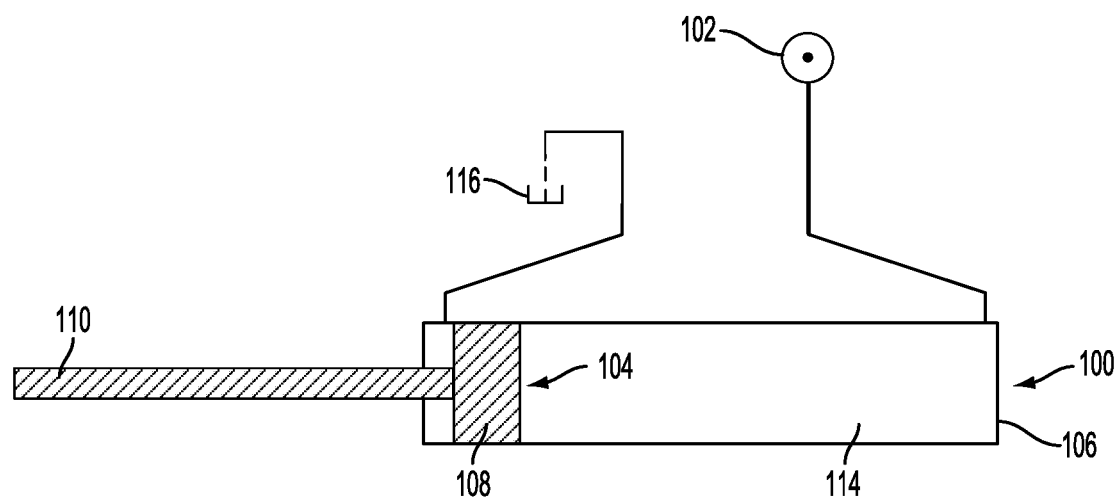
FIG. 1B illustrates a change in fluid volume causing mechanical motion of a piston of the hydraulic actuator shown in FIG. 1A, in accordance with an example implementation.

FIG. 1B illustrates a change in fluid volume causing mechanical motion of the piston 104 of the actuator 100, in accordance with an example implementation. As the piston 104 extends, volume of the chamber 114, which is being filled by the pressurized fluid, increases as shown in FIG. 1B. Fluid in the chamber 112 flows to a tank or reservoir 116 having fluid at a low pressure.

In this manner, fluid energy of the pressurized fluid flowing into the chamber 114 is converted into mechanical motion of the piston 104, while volume of the fluid in the chamber 114 is increasing. Thus, in such a hydraulic actuator, mechanical motion is accompanied by fluid volume expansion. As an example, if the piston 104 is in a fully retracted position (i.e., the piston 104 is at a right end of the cylinder 106 in FIG. 1B), and is then fully extended, the volume expansion is approximately 100% of displaceable volume within the cylinder 106. The displaceable volume is the volume within the cylinder 106 excluding volume occupied by the piston head 108, and any other components (not shown in FIGS. 1A-1B) that accommodate ports connecting the cylinder to other components of the hydraulic system.

Disclosed herein are apparatuses and systems that work on a distinguishable principle: fluid energy is converted into mechanical motion, while fluid volume remains substantially the same or changes infinitesimally. As shown and described below, instead of a fluid volume expansion, a gearing system is coupled to a moving member and turns fluid energy into motion of the moving member while fluid volume changes infinitesimally or remains substantially constant. Three example implementations are described below. Each implementation includes an element (e.g., a plate) that is repelled under fluid pressure from an underlying surface, thus setting in motion a gearing mechanism that ultimately leads to the element itself moving along the underlying surface without a substantial change in fluid volume. However, these implementations are examples for illustration, and are not meant to be limiting. Other example implementations that use the same principle are possible as well.

II. EXAMPLE APPARATUSES AND SYSTEMS a. Inclined Plane Implementation

Figure 2A:
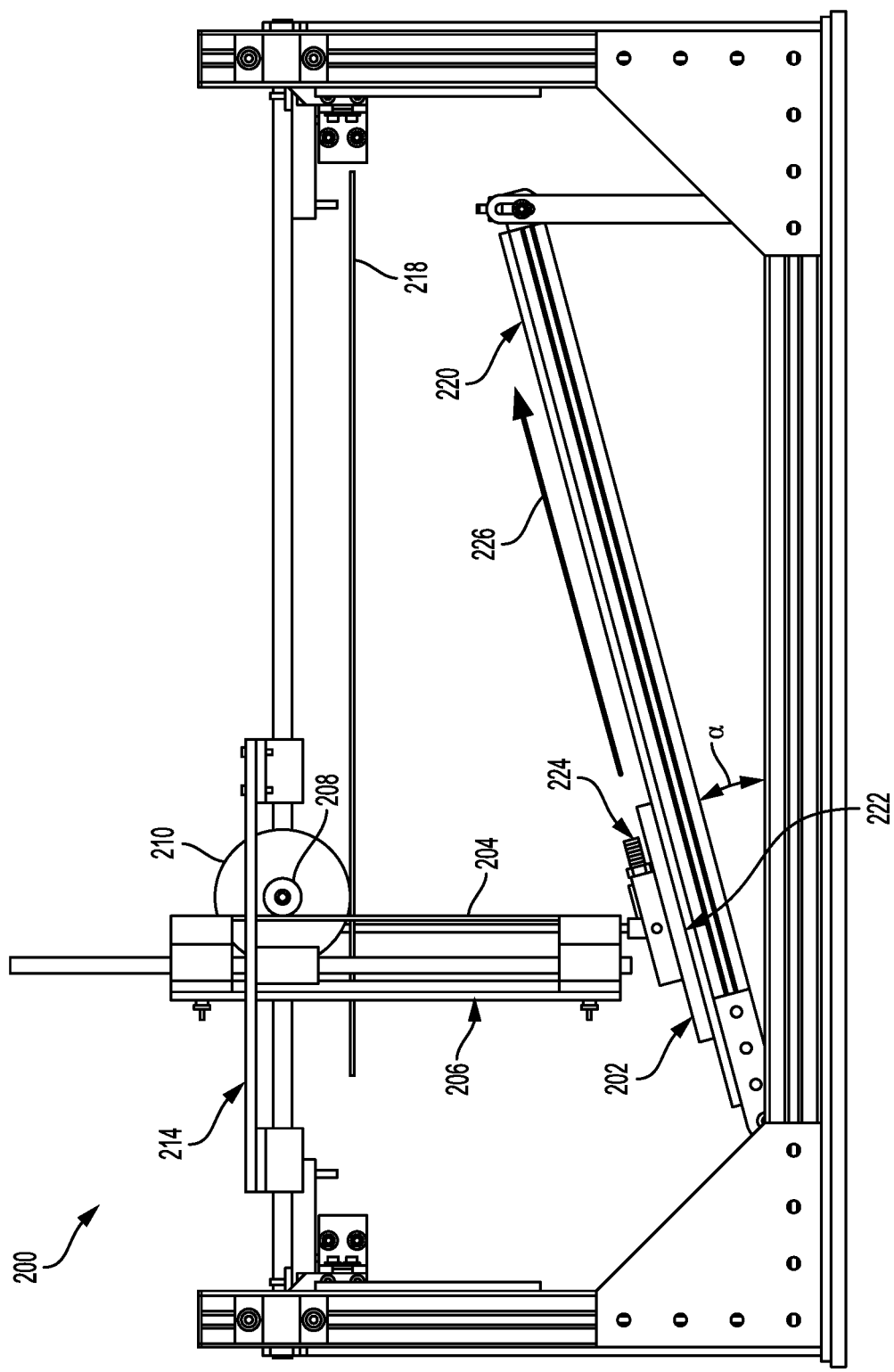
FIG. 2A illustrates a front view of an apparatus for converting fluid pressure to mechanical motion, in accordance with an example implementation.
Figure 2B:
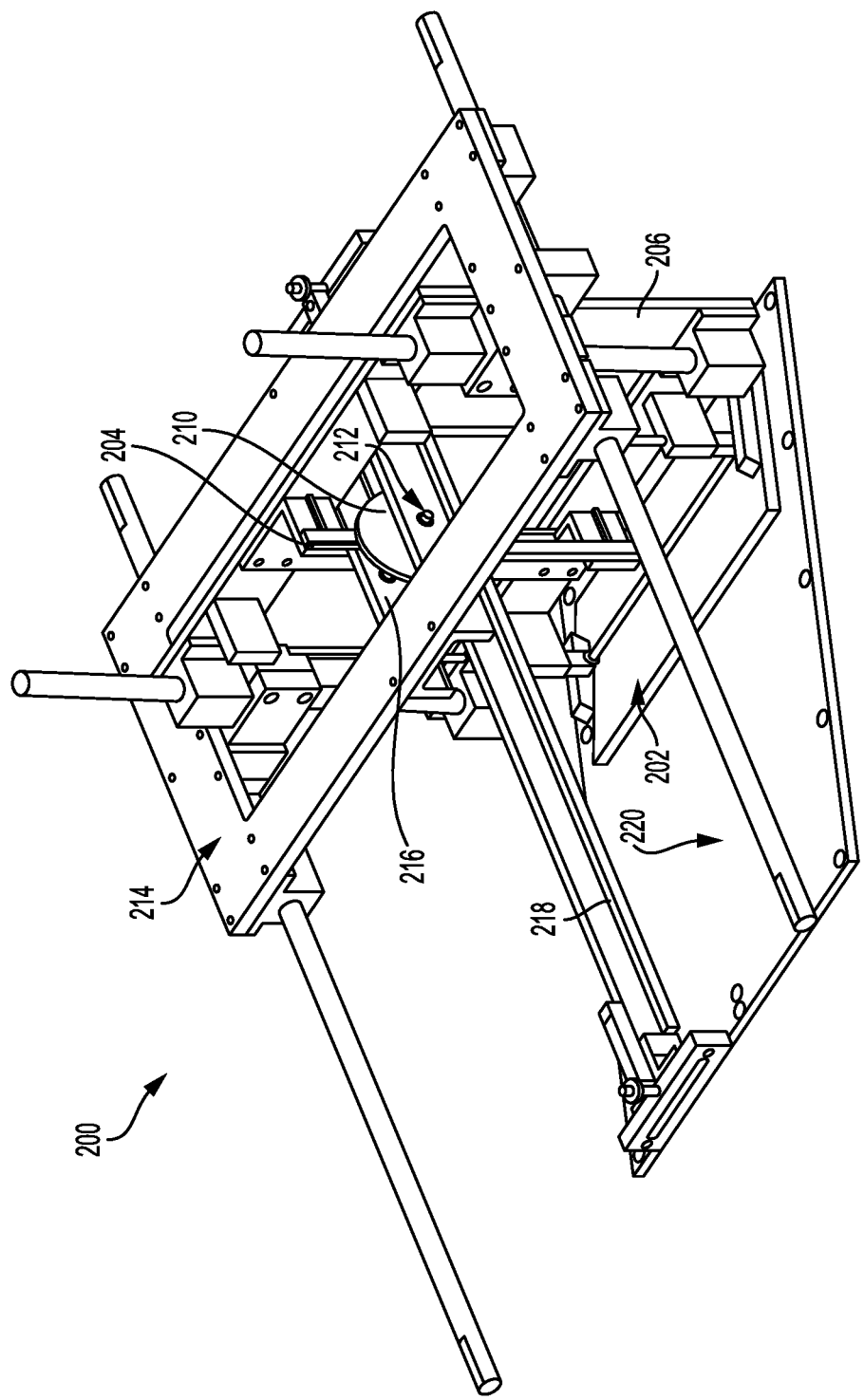
FIG. 2B illustrates a perspective posterior view of the apparatus of FIG. 2A, in accordance with an example implementation.

FIG. 2A illustrates a front view of an apparatus 200 for converting fluid pressure to mechanical motion, and FIG. 2B illustrates a perspective posterior view of the apparatus 200, in accordance with an example implementation. The apparatus 200 includes a plate 202 and a vertical rack gear 204 attached to the plate 202 via a vertical trolley 206. A vertical spur gear 208 engages, and is configured to be driven by, the vertical rack gear 204.

Figure 2C:
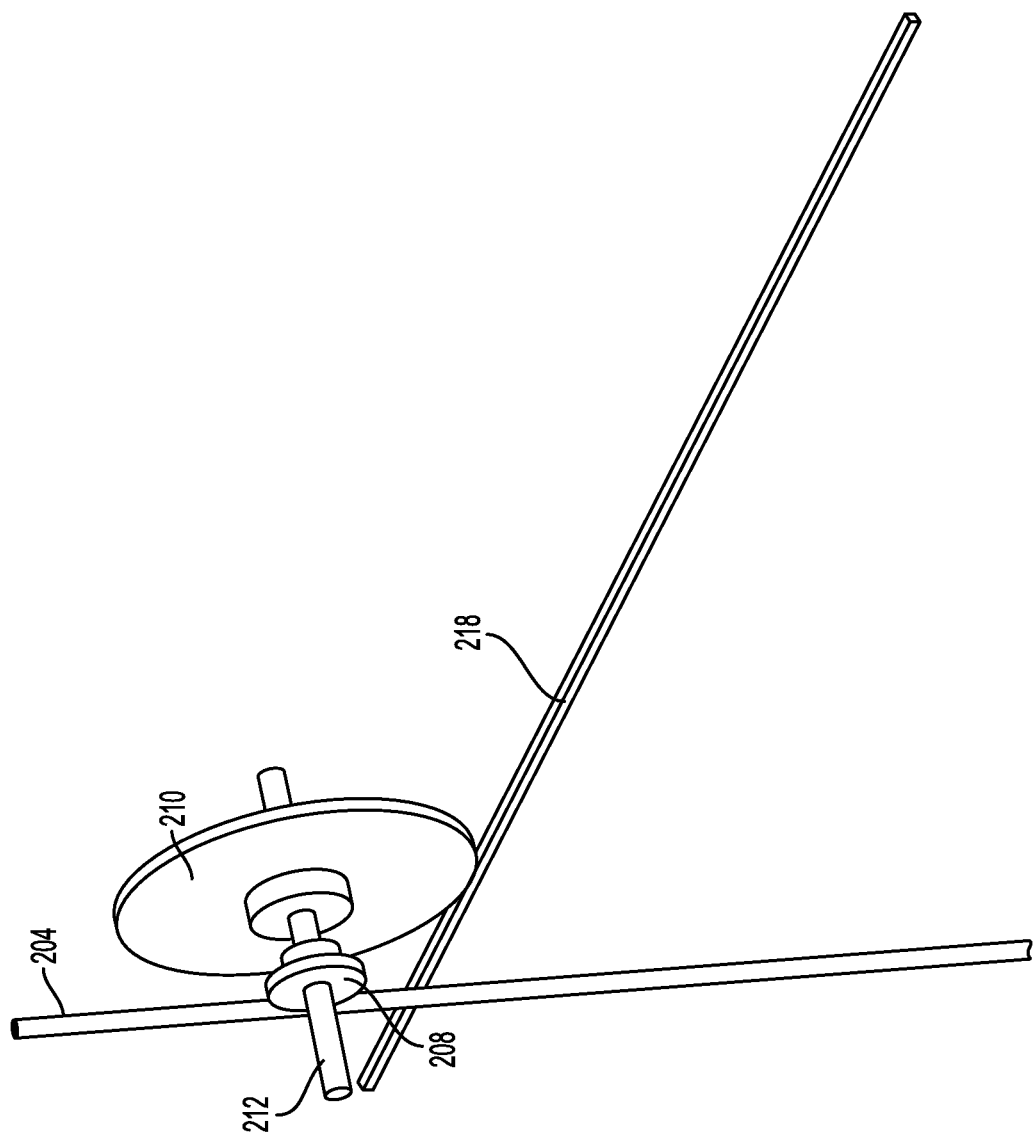
FIG. 2C illustrates a horizontal spur gear coupled to a vertical spur gear, in accordance with an example implementation.

A horizontal spur gear 210 is coupled to the vertical spur gear 208. FIG. 2C illustrates the horizontal spur gear 210 coupled to the vertical spur gear 208, in accordance with an example implementation. As shown in FIG. 2C, both the horizontal spur gear 210 and the vertical spur gear 208 are mounted on a shaft 212. Thus, the horizontal spur gear 210 and the vertical spur gear 208 form a compound gear configured to rotate at the same speed.

Further, both the horizontal spur gear 210 and the vertical spur gear 208 are attached to a horizontal trolley 214 via a gear housing 216 shown in FIG. 2B. The horizontal spur gear 210 is also coupled to a horizontal rack gear 218. Unlike the vertical rack gear 204, which is movable with the plate 202, the horizontal rack gear 218 is fixedly mounted.

Referring back to FIG. 2A, a gap 222 separates the plate 202 from an underlying inclined surface 220. The apparatus 200 is configured such that pressurized fluid can be delivered to the gap 222. For instance, the plate 202 may include a connector 224 that could be connected to a source of pressurized fluid (e.g., a pump, a reservoir of fluid, where a bottom of the reservoir is coupled to the connector 224, etc.). The plate 202 may include one or more channels that then communicate fluid received at the connector 224 to the gap 222 to form a layer of pressurized fluid therein.

In other examples, the connector 224 could be coupled to the inclined surface 220, and the inclined surface 220 may have channels through which pressurized fluid flows to the gap 222 to form the layer of pressurized fluid therein.

The pressurized fluid in the gap 222 repels the plate 202 away from the underlying surface 220. The plate 202 may consequently begin to move infinitesimally away from the underlying surface 220, thus causing the vertical rack gear 204 to move linearly upward and the vertical spur gear 208 to rotate clockwise. Rotation of the vertical spur gear 208 causes the horizontal spur gear 210 to rotate because both gears 208 and 210 are mounted to the same shaft 212.

As mentioned above, the horizontal spur gear 210 engages the horizontal rack gear 218, which is fixed. Thus, rotation of the horizontal spur gear 210 causes the horizontal trolley 214, the vertical trolley 206, and the plate 202 to all move horizontally, and the plate 202 therefore moves along the underlying surface 220 in a direction of an arrow 226 shown in FIG. 2A.

As a particular example for illustration, assume that the plate 202 and the vertical rack gear 204 move upward by an amount $\Delta y = \pi \cdot D_{VSG}$, where $D_{VSG}$ is a pitch diameter of the vertical spur gear 208. Thus, this upward movement of the vertical rack gear 204 causes the vertical spur gear 208 to undergo one complete revolution. The two spur gears 208 and 210 are mounted on the same shaft 212, and thus they rotate the same amount. The horizontal spur gear 210 therefore also undergoes one complete revolution. Because the horizontal rack gear 218 is fixed, the horizontal trolley 214, the vertical trolley 206, and the plate 202 all move horizontally by an amount of $\Delta x = \pi \cdot D_{HSG}$, where $D_{HSG}$ is a pitch diameter of the horizontal spur gear 210. Thus, the ratio of the vertical travel of the plate 202 to horizontal travel of the trolleys 206 and 214 is:

$$R = \frac{\Delta y}{\Delta x} = \frac{\pi \cdot D_{VSG}}{\pi \cdot D_{HSG}} = \frac{D_{VSG}}{D_{HSG}} = \text{Gear Ratio} \quad (1)$$

Gear Ratio R is the gear ratio of the vertical spur gear 208 to the horizontal spur gear 210. Accordingly, for the plate 202 to follow the inclined surface 220 as it moves, the inclined surface 220 could be oriented with the same ratio of vertical to horizontal travels, R. In this case, the tangent of an angle $\alpha$ of the inclined surface 220 may be:

$$\tan(\alpha) = \frac{D_{VSG}}{D_{HSG}} \quad (2)$$

$$\Rightarrow \alpha = \tan^{-1}\left(\frac{D_{VSG}}{D_{HSG}}\right)$$

As a specific example, assuming that $D_{VSG}$ is 1 inch and $D_{HSG}$ is 3.625 inches, the angle can be calculated by equation (2) as:

$$\Rightarrow \alpha = \tan^{-1}\left(\frac{1}{3.625}\right) = 15.422° \quad (3)$$

In this manner, energy in the pressurized fluid disposed in the gap 222 is converted into mechanical motion of the plate 202. As the plate 202 climbs along the underlying inclined surface 220, volume of fluid in the gap 222 remains substantially the same or changes infinitesimally. Such an infinitesimal volume change accounts for leakage of fluid and any infinitesimal movement of the plate 202 away from the underlying surface 220 as it is repelled away from the underlying surface 220 under fluid pressure. The term "substantially" is used herein to indicate that the fluid volume in the gap 222 remains within a threshold volume value (e.g., fluid volume changes by less than 5%) from an initial fluid volume in the gap 222 as the plate 202 moves along the underlying surface 220.

In examples, the apparatus 200 may include other components. For instance, to reduce fluid seepage from the gap 222, a movable adjusting plate could be coupled to a bottom of the plate 202 such that the gap 222 is disposed between the plate 202 and the movable adjusting plate. Under fluid pressure, the movable adjusting plate may tend to thrust away from the plate 202 toward the underlying surface 220, while the plate 202 is repelled away from the movable adjusting plate. In another example, rollers may be added at the bottom of the movable adjusting plate so as to reduce friction between the movable adjusting plate and the underlying surface 220 as the movable adjusting plate moves along the underlying surface. In still another example, both the plate 202 and the underlying surface 220 could be magnetized with like poles to enhance repelling the plate 202 away from the underlying surface 220. Other additional components are possible as well.

b. Rotating Disk Implementation

Figure 3A:
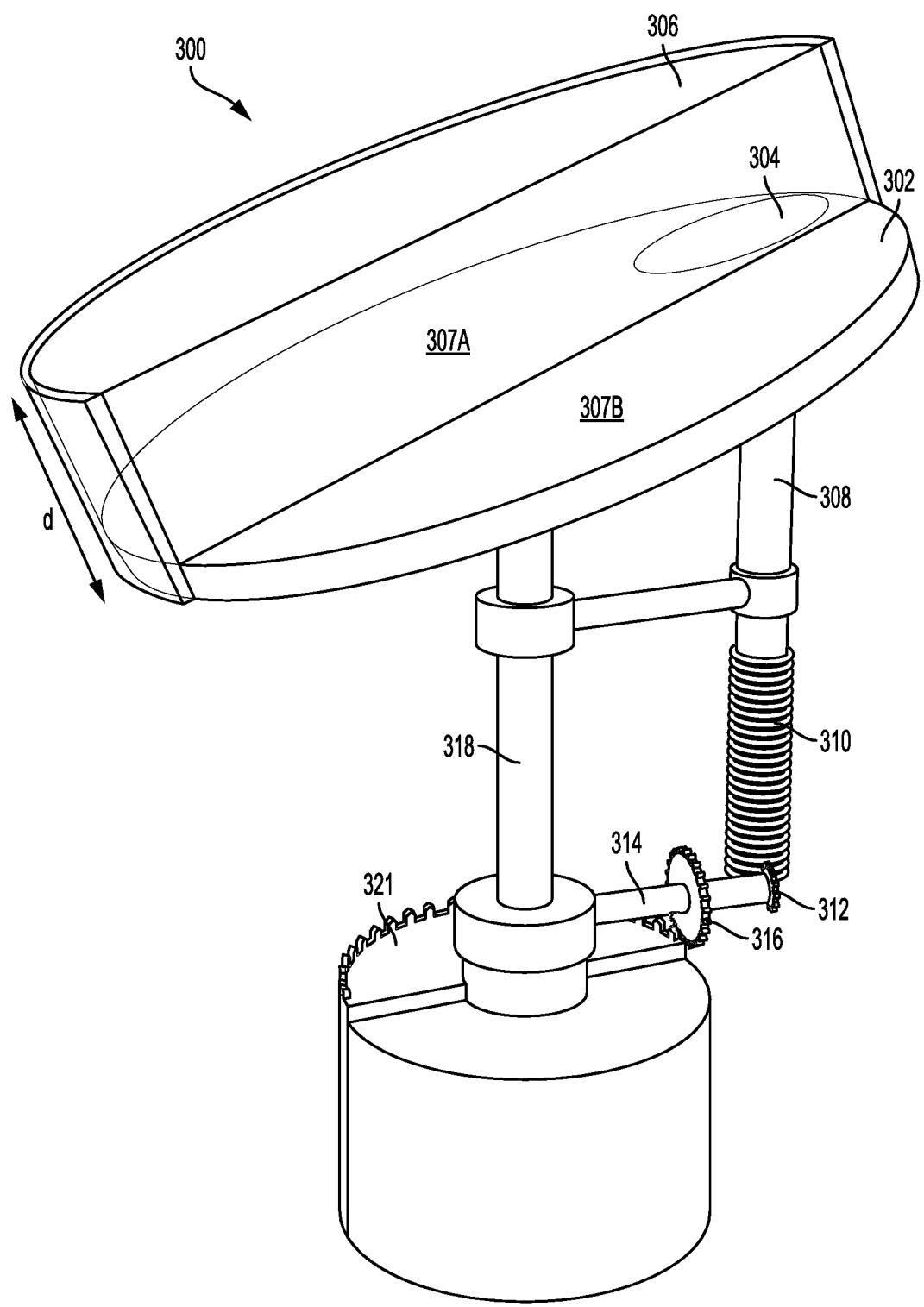
FIG. 3A illustrates a perspective top view of another apparatus for converting fluid pressure to mechanical motion, in accordance with an example implementation.
Figure 3B:
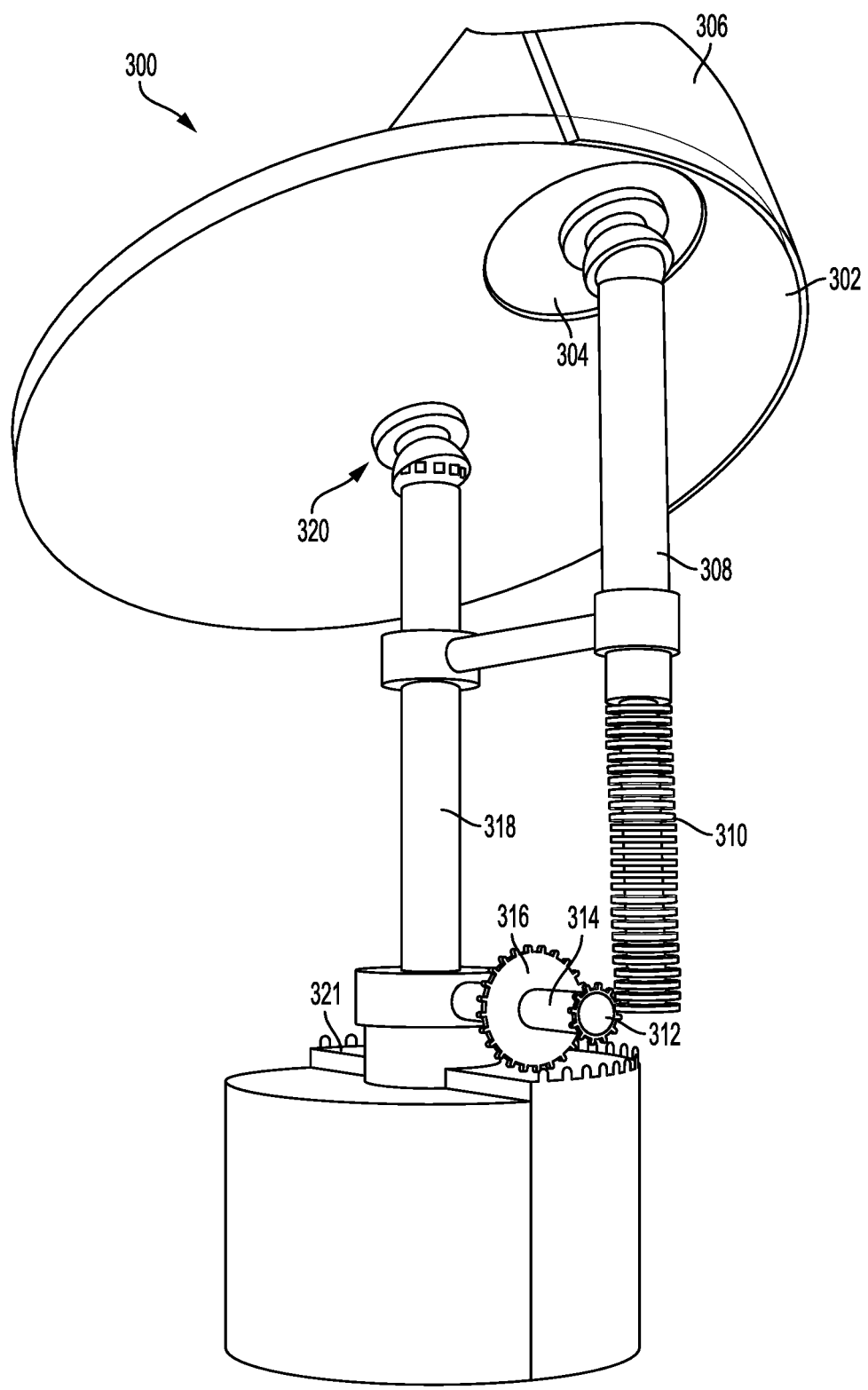
FIG. 3B illustrates a perspective bottom view of the apparatus of FIG. 3A, in accordance with an example implementation.

FIG. 3A illustrates a perspective top view of another apparatus for converting fluid pressure to mechanical motion, and FIG. 3B illustrates a perspective bottom view of the apparatus 300, in accordance with an example implementation. The apparatus 300 includes a disk 302. The disk 302 includes a hole configured to receive another disk 304. A container 306 may be coupled to the disk 302, such that fluid in the container 306 applies pressure on a portion 307A of the disk 302. A remaining portion 307B of the disk 302 is not exposed to fluid in the container 306, and may be exposed to, for example, atmospheric pressure. As explained below, the disk 302 is configured to rotate. As the disk 302 rotates, different portions of the disk 302 are exposed to the fluid in the container 306. In other words, the container 306 remains fixed, while the disk 302 rotates.

The pressure level of fluid at the bottom of the container 306 is based on a depth "d" of the container 306, among other factors. For instance, fluid may be pumped into the container 306 at a high pressure. In this case, the pressure applied on the portion of the disk 302 that is exposed to the fluid is based on both the depth "d" and the pressure level of fluid being pumped into the container 306.

When the disk 304 is within the portion of the disk 302 that is exposed to fluid, a surface of the disk 304 is exposed to pressure of fluid in the container 306. In response to force applied to the surface of the disk 304 by fluid pressure, the disk 304 is repelled (like the plate 202 of FIG. 2A is also repelled away from the surface 220) away from the container 306 (i.e., downward in FIG. 3A). The disk 304 may thus begin to move infinitesimally within the disk 302. The disk 304 is further coupled to a shaft 308, and at least a portion of the shaft 308 includes a rack gear 310.

The rack gear 310 meshes with or engages a spur gear 312, which is coupled via a shaft 314 to another spur gear 316. The spur gear 312 and the spur gear 316 thus rotate at the same rate. The shaft 314 extends beyond the spur gear 316 and couples both spur gears 312 and 316 to another shaft 318. The shaft 318 in turn is coupled to a center region 320 (shown in FIG. 3B) of the disk 302. Further, the spur gear 316 engages a fixed ring gear 321.

In this configuration, when the disk 304 is repelled under fluid pressure and begins to move infinitesimally within the disk 302, the rack gear 310 extends, thus causing the spur gears 312 and 316 to rotate. Because the ring gear 321 is fixed, rotation of the spur gear 316 causes an assembly of the disk 302, the disk 304, the shaft 308 and the rack gear 310, and both spur gears 312 and 316 and their coupling shaft 314 to rotate about an axis of the shaft 318.

The container 306 remains stationary and does not rotate with the disk 302, and thus as the disk 302 rotates, the disk 304 will transition away from the container 306. Further, as shown in FIGS. 3A-3B, teeth of the ring gear 321 do not span an entire circumference of a circle, but span only a portion (e.g., half a circle). In other words, the ring gear 321 could be a partial ring gear. In this manner, teeth of the spur gear 316 engage the teeth of the ring gear 312 when the pressurized fluid in the container 306 repels the disk 304. However, as the disk 304 transitions away from the container 306, the teeth of the spur gear 316 do not engage any gear teeth. Thus, no friction results and rotation of the assembly (i.e., the disk 302, the disk 304, the shaft 308 and the rack gear 310, and both spur gears 312 and 316 and their coupling shaft 314) about the axis of the shaft 318 is not hindered. In other examples, the ring gear 321 could be a full ring gear.

To increase rotational power output of the shaft 318, more than one hole and more than one disk such as the disk 304 may be disposed within the disk 302 as described next.

Figure 3C:
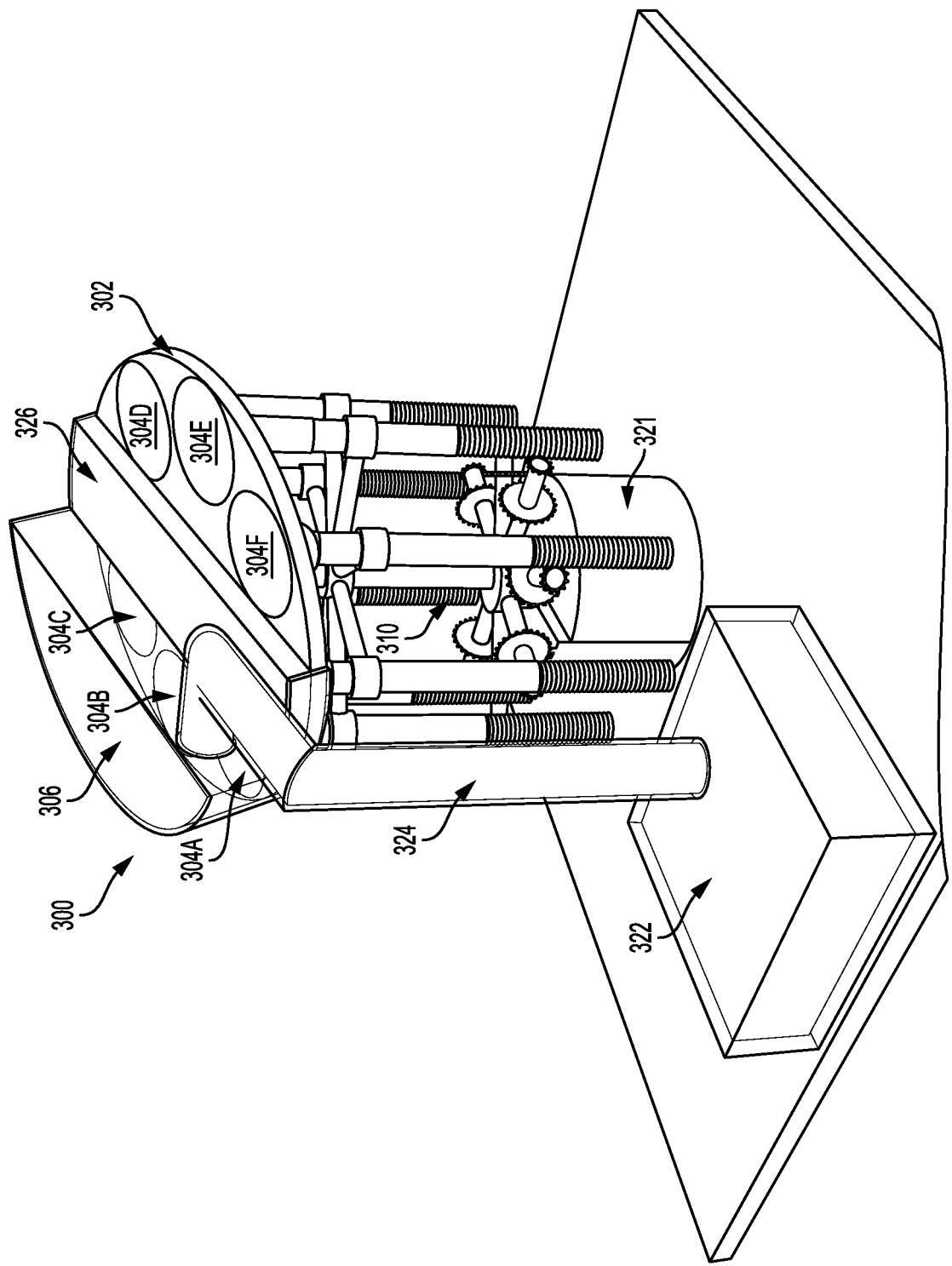
FIG. 3C illustrates a perspective top view of the apparatus of FIG. 3A with a disk having multiple disks disposed therein, in accordance with an example implementation.

FIG. 3C illustrates a perspective top view of the apparatus 300 with the disk 302 having multiple disks disposed therein, in accordance with an example implementation. FIG. 3C illustrates the disk 302 with eight disks disposed therein. A pressurized fluid source 322 may be configured to deliver high pressure fluid to the container 306 through a pipe system 324. The pressurized fluid source 322 is depicted as a container; however, the pressurized fluid source 322 a pump and/or accumulator configured to store and deliver high pressure fluid to the container 306. In other configuration, the pressurized fluid source 322 may be disposed at an elevation higher than the container 306 so as to provide fluid having a pressure head to drive the disk(s) 304.

As shown in FIG. 3C, at a given rotational position of the disk 302, three disks 304A, 304B, and 304C are exposed to high pressure fluid in the container 306. Also, three disks 304D, 304E, and 304F are not exposed to the high pressure fluid, but may be exposed to atmospheric pressure or, generally, a lower pressure than the disks 304A-304C. Two other disks not shown are in a transition region below a transition wiper 326. The three disks 304A-304C exposed to high pressure fluid are repelled downward, and thus cause their respective rack gears (e.g., the rack gear 310) to extend. Consequently, spur gears engaging the respective rack gears rotate and ultimately the shaft 318 and the disk 302 to rotate The transition wiper 326 is disposed over an area of the disk 302 between the portion exposed to the high pressure fluid and the portion not exposed to high pressure. As the disk 302 rotates due to the disks 304 being repelled under fluid pressure, the disks 304 transition in and out of the portion exposed to the high pressure fluid. As a given disk of the disks 304 transitions across the transition wiper 326, any fluid on the transitioning disk is wiped away by the transition wiper 326.

In examples, the container 306 and the disk 304 could be magnetized to have the same pole so as to further cause the disk 304 to be repelled downward. Further, the transition wiper 326 could have an opposite pole relative to the disk 304 so as to attract the disc 304 toward the transition wiper 326.

Figure 3D:
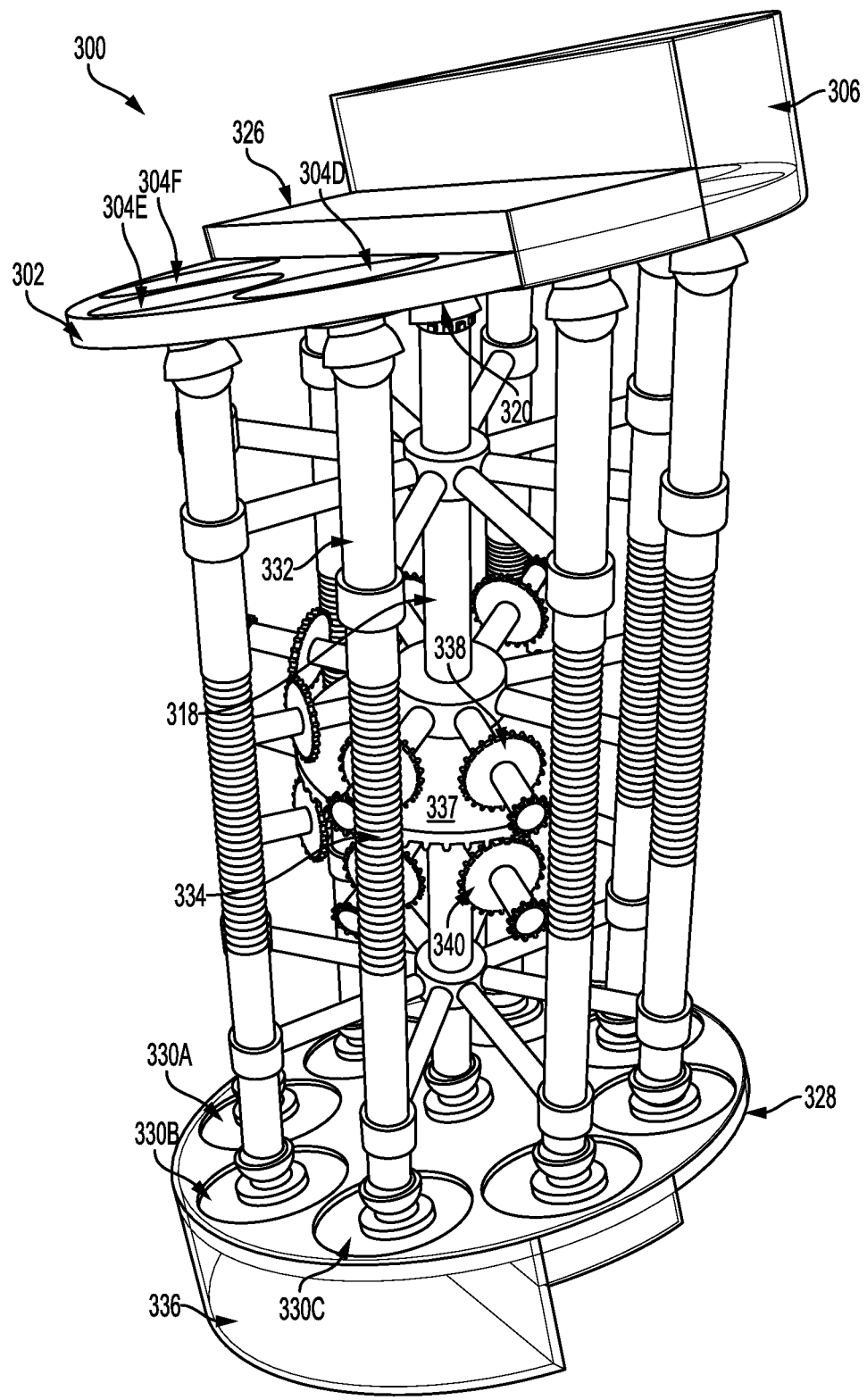
FIG. 3D illustrates a perspective view of the apparatus of FIG. 3C with two parallel disks, each disk having eight disks disposed therein, in accordance with an example implementation.

Adding even more disks may increase rotational power output of the apparatus 300. FIG. 3D illustrates a perspective view of the apparatus 300 with two parallel disks, each disk having eight disks disposed therein, in accordance with an example implementation. The apparatus 300 may include a complementary disk 328 disposed opposite to the disk 302. Eight disks such as the disks 330A, 330B, and 330C are disposed within respective holes in the disk 328, and these eight disks are complementary to the eight disks 304 disposed within the disk 302. Further, one shaft, such as a shaft 332, couple each disk to its complementary, such as the disks 304D and 330C. A portion of the shaft 332 is configured as a rack gear 334.

A container 336 includes pressurized fluid and is disposed on a portion of the disk 328. The container 336 is configured such that when a disk of the disks 304, such as the disk 304D, exits the wiper transition 326, the complementary disk 330C enters a portion of the disk 328 that is exposed to high pressure fluid of the container 336. With this configuration, the disk 304D may stop contributing to rotation of the disk 302 as it transitions away from the high pressure of container 306, while the corresponding disk 330C begins contributing to rotation of the disk 328 under pressure from fluid in the container 336.

Thus, while three disks disposed in the disk 302 are exposed to high pressure from fluid in the container 306 and are repelled downward, the three corresponding disks within the disk 328 are not exposed to high pressure fluid in the container 336. Similarly, while three disks disposed in the disk 328 are exposed to high pressure from fluid in the container 336 and are repelled upward, the three complementary disks within the disk 302 are travelling upward to go back to the beginning of their respective strokes. This way, when three disks are exposed to high pressure fluid and are, in response, causing the inclined disks to rotate, the three complementary disks are being prepared to enter the portion of their corresponding inclined disk being exposed to high pressure fluid.

As shown in FIG. 3D, a fixed rack gear 337 has gear teeth facing upward along half the circumference, and gear teeth facing downward along the remaining half circumference. That way, spur gears, such as spur gears 338 and 340, engage teeth of the fixed ring gear 337 during half a revolution only, while being disengaged for the remaining half. Particularly, spur gears associated with disks being exposed to high pressure engage teeth of the ring gear 337, whereas spur gears associated with disks not being exposed to high pressure are disengaged from teeth of the ring gear 337.

Figure 3E:
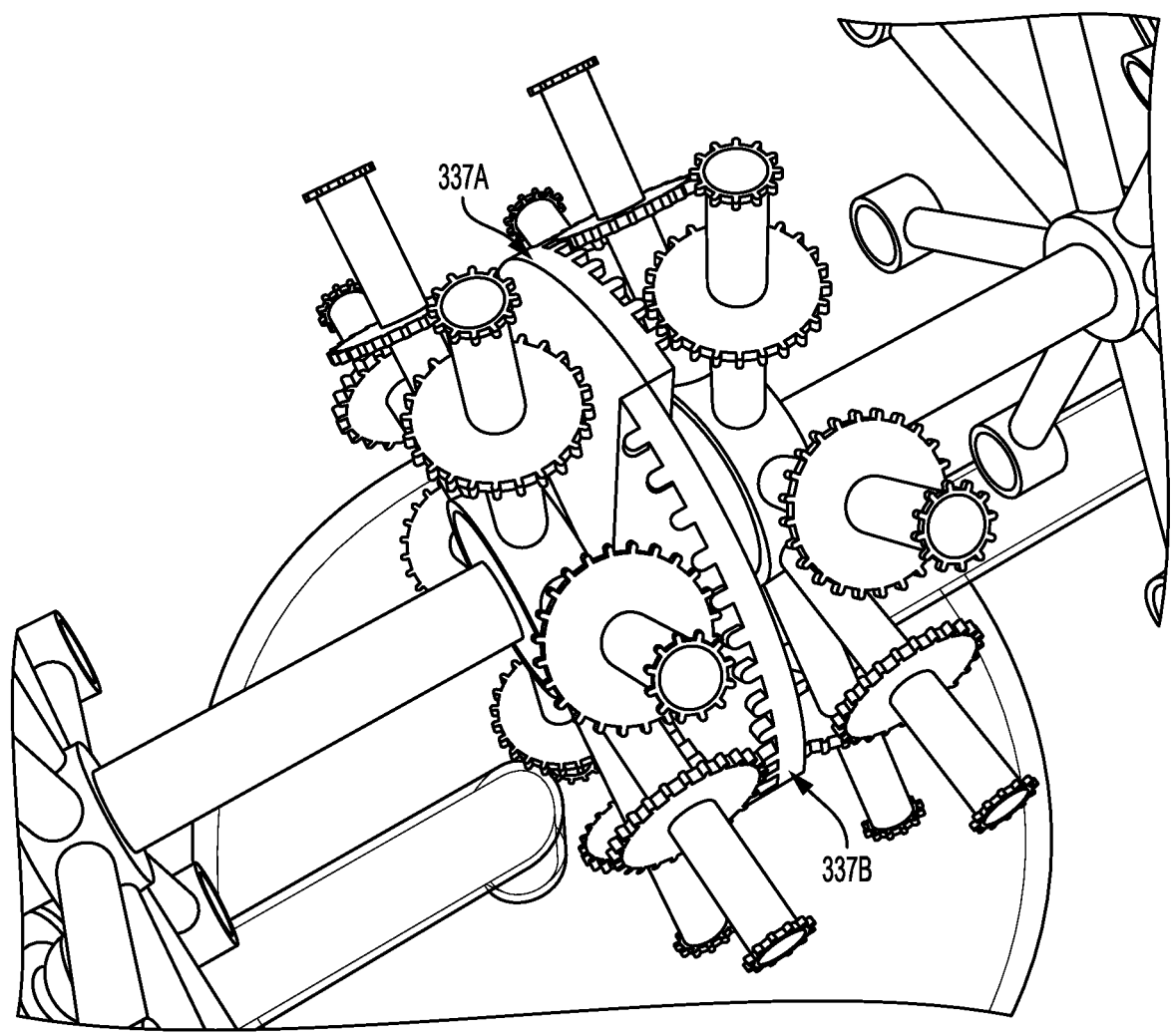
FIG. 3E illustrates a split rack gear for the apparatus illustrated in FIG. 3D, in accordance with an example implementation.

FIG. 3E illustrates a split ring gear 337 for the apparatus illustrated in FIG. 3D, in accordance with an example implementation. In the configuration shown in FIG. 3E, the ring gear 337 may be split into two gears, 337A and 337B, with teeth of the ring gear 337A facing upward, whereas teeth of the rack gear 337B facing downward.

As the disks 302 and 328 rotate continuously, so will the shaft 318 connected to respective center regions (e.g., the center region 320). Rotation of the shaft 318 can be utilized, for example, to drive a power source (e.g., an electrical generator) or drive a pump.

Figure 3F:
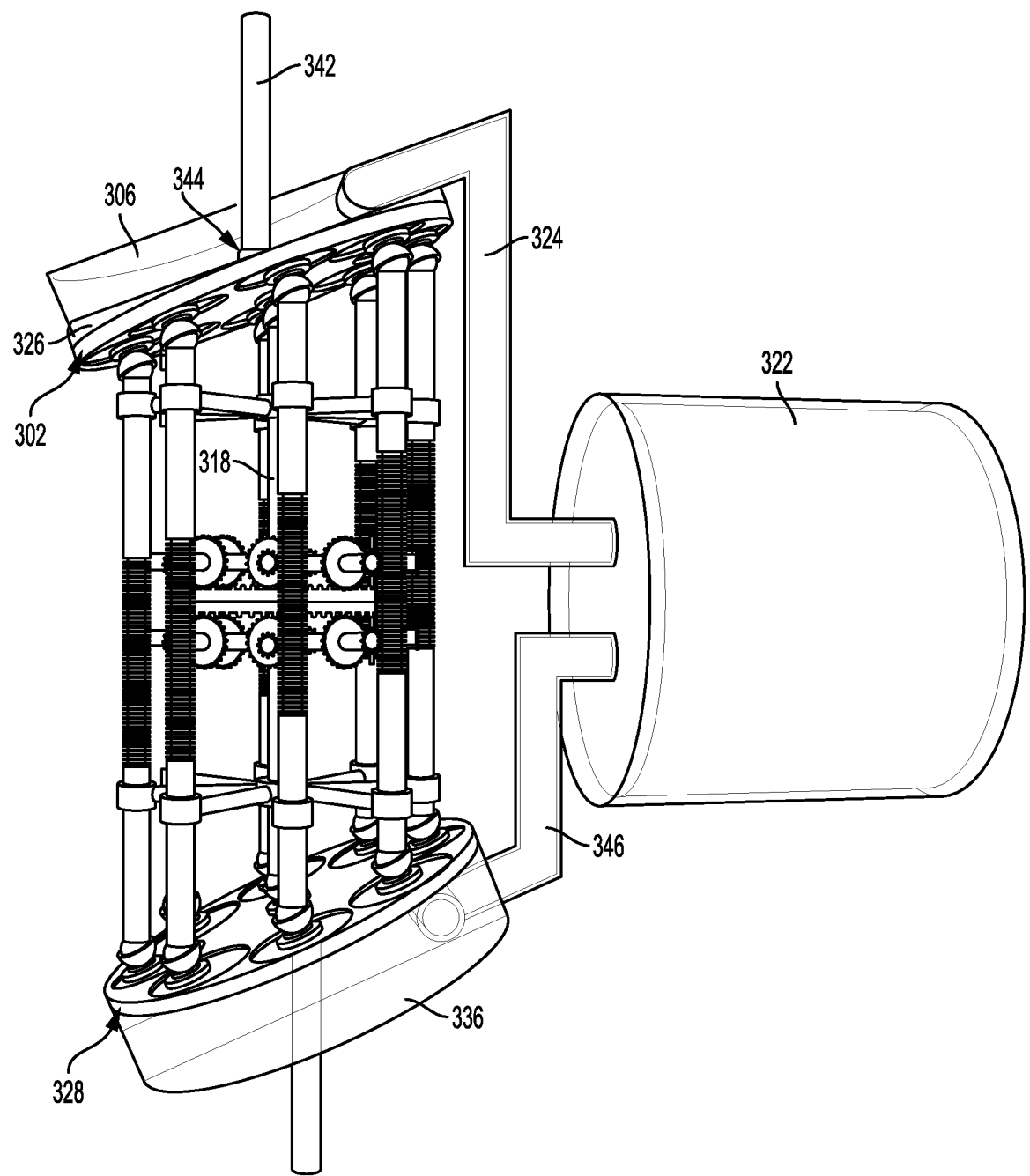
FIG. 3F illustrates a shaft of the apparatus illustrated in FIG. 3D coupled to another shaft that could be connected to a power source, in accordance with an example implementation.

FIG. 3F illustrates the shaft 318 coupled to another shaft 342 that could be connected to a power source, in accordance with an example implementation. As mentioned above, an example power source may include an electrical generator. The transition wiper 326 may have a hole disposed within which is a coupling 344 configured to couple the shaft 318 to the shaft 342. The coupling 344 is configured to compensate for an offset between the shafts 318 and 342 (i.e., an offset between respective axes of rotation of the shafts 318 and 342) resulting from the plate 302 being inclined. FIG. 3F also depicts a pipe system 346 that is configured to deliver high pressure fluid from the pressurized fluid source 322 to the container 336.

To make the ring gear 337 structurally fixed, the shaft 318 may be a hollow shaft. Another shaft could be disposed within the hollow shaft 318. That other shaft may be affixed to the ring gear 337, and may extend beyond one or both disks 302 and 328. That other shaft within the shaft 318 may be then be attached to a fixed structure so as to render the ring gear 337 structurally fixed.

The configurations shown in FIGS. 3A-3F are examples for illustration, and alternative configurations are possible. For example, a greater or smaller number of disks 304 and 330 could be used, i.e., greater or less than eight disks could be disposed within each of the inclined disks 302 and 328. Further, disks 304 (or 330) of varying sizes could be used to use space of the disk 302 efficiently.

Figure 3G:
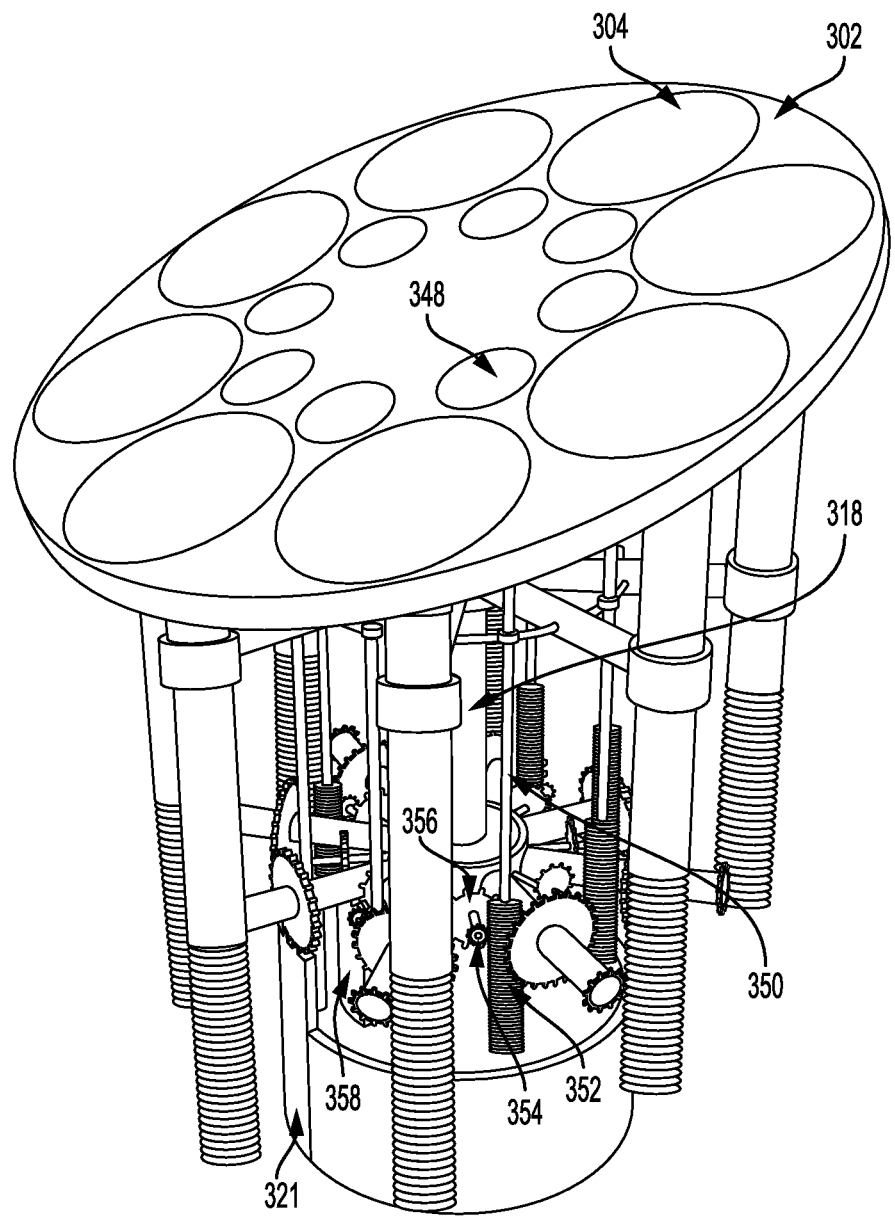
FIG. 3G illustrates a disk having multiple disks of varying sizes disposed therein, in accordance with an example implementation.

For instance, FIG. 3G illustrates the apparatus 300 with the disk 302 having multiple disks of varying sizes disposed therein, in accordance with an example implementation. As shown in FIG. 3G in addition to the disks(s) 304, smaller disks such as a disk 348 are disposed within the disk 302. Each of the smaller disks is attached to its own gear train. For example, the disk 348 is coupled to a shaft 350. An end of the shaft 350 is a rack gear 352 that engages a spur gear 354, which is coupled to another spur gear 356. The spur gear 356 engages another ring gear 358 disposed within the ring gear 321. Thus, the disks 348 aid the larger disk(s) 304 in causing the disk 302 to rotate about its axis and might increase power output at the shaft.

Similar to the teeth of the ring gear 321, teeth of the ring gear 358 do not span an entire circumference of a circle, but span only a portion (e.g., half a circle). In other words, the ring gear 358 could be a partial ring gear. In this manner, teeth of the spur gear 356 engage the teeth of the ring gear 358 when the pressurized fluid in the container 306 repels the disk 348. However, as the disk 304 transitions away from the container 306, the teeth of the spur gear 356 do not engage any gear teeth. In other examples, the ring gear 358 could be a full ring gear.

Figure 3H:
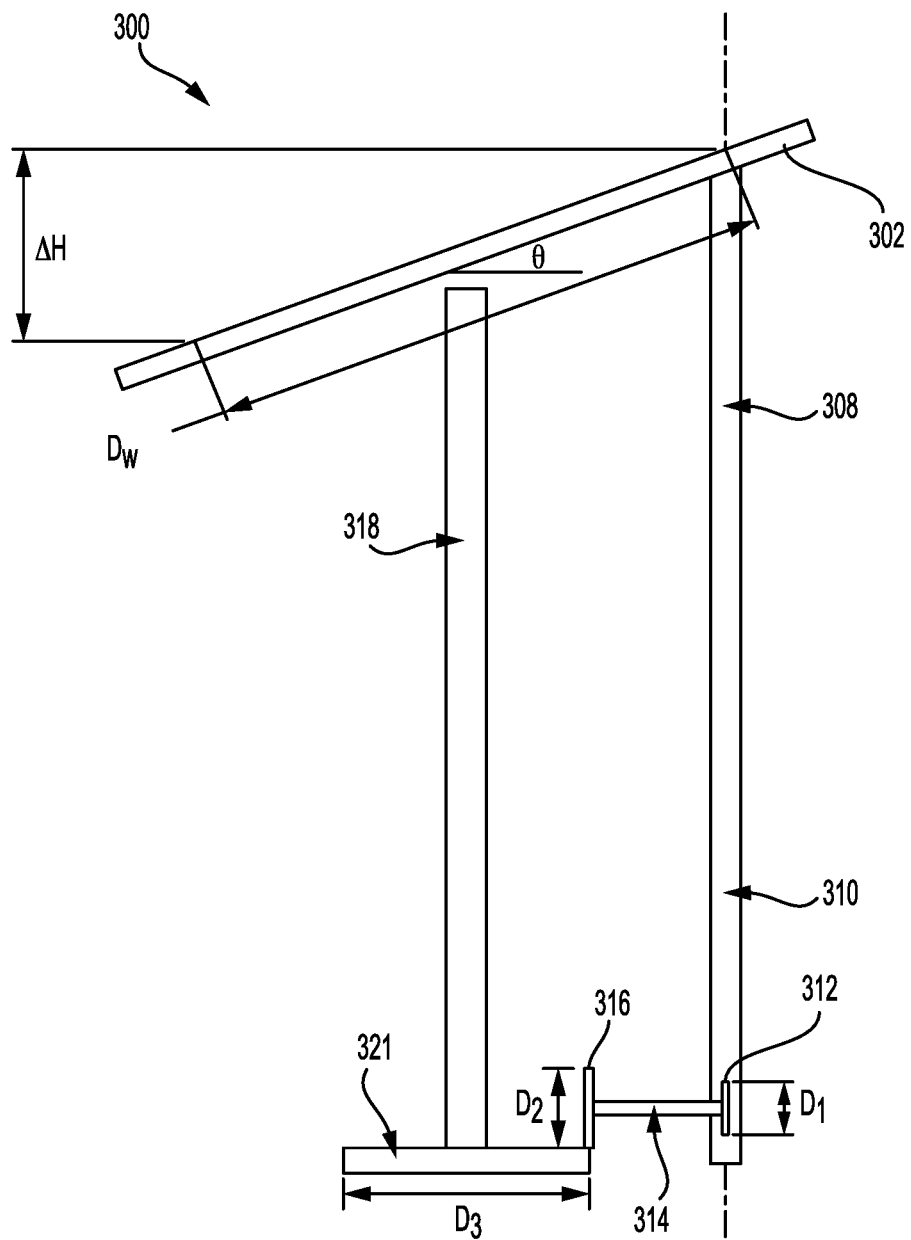
FIG. 3H illustrates a perspective simplified view showing geometric relationships between elements of the apparatus illustrated in FIGS. 3A-3B, in accordance with an example implementation.
Figure 3I:
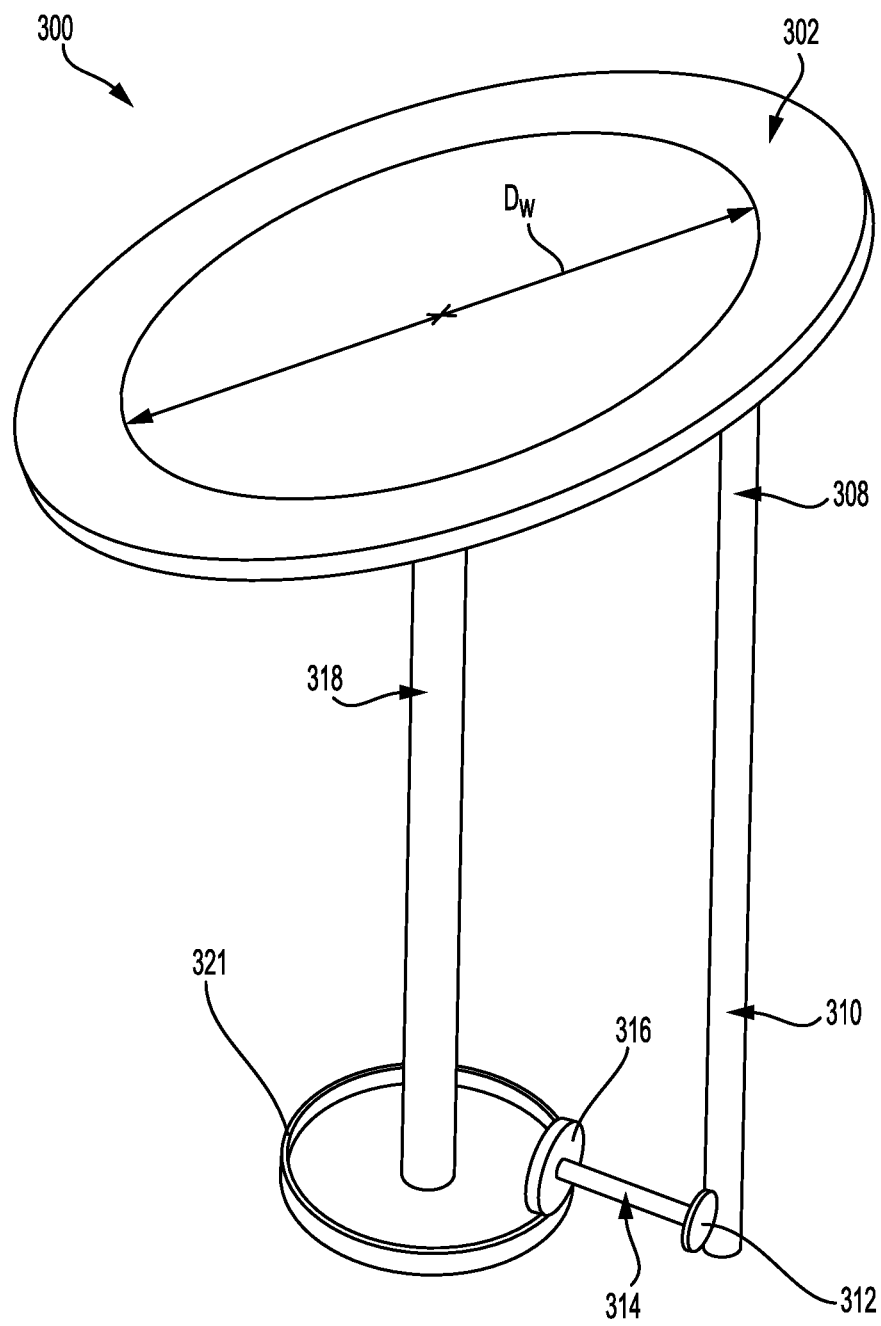
FIG. 3I illustrates a side simplified view showing the geometric relationships between elements of the apparatus illustrated in FIGS. 3A-3B, in accordance with an example implementation.
Figure 3J:
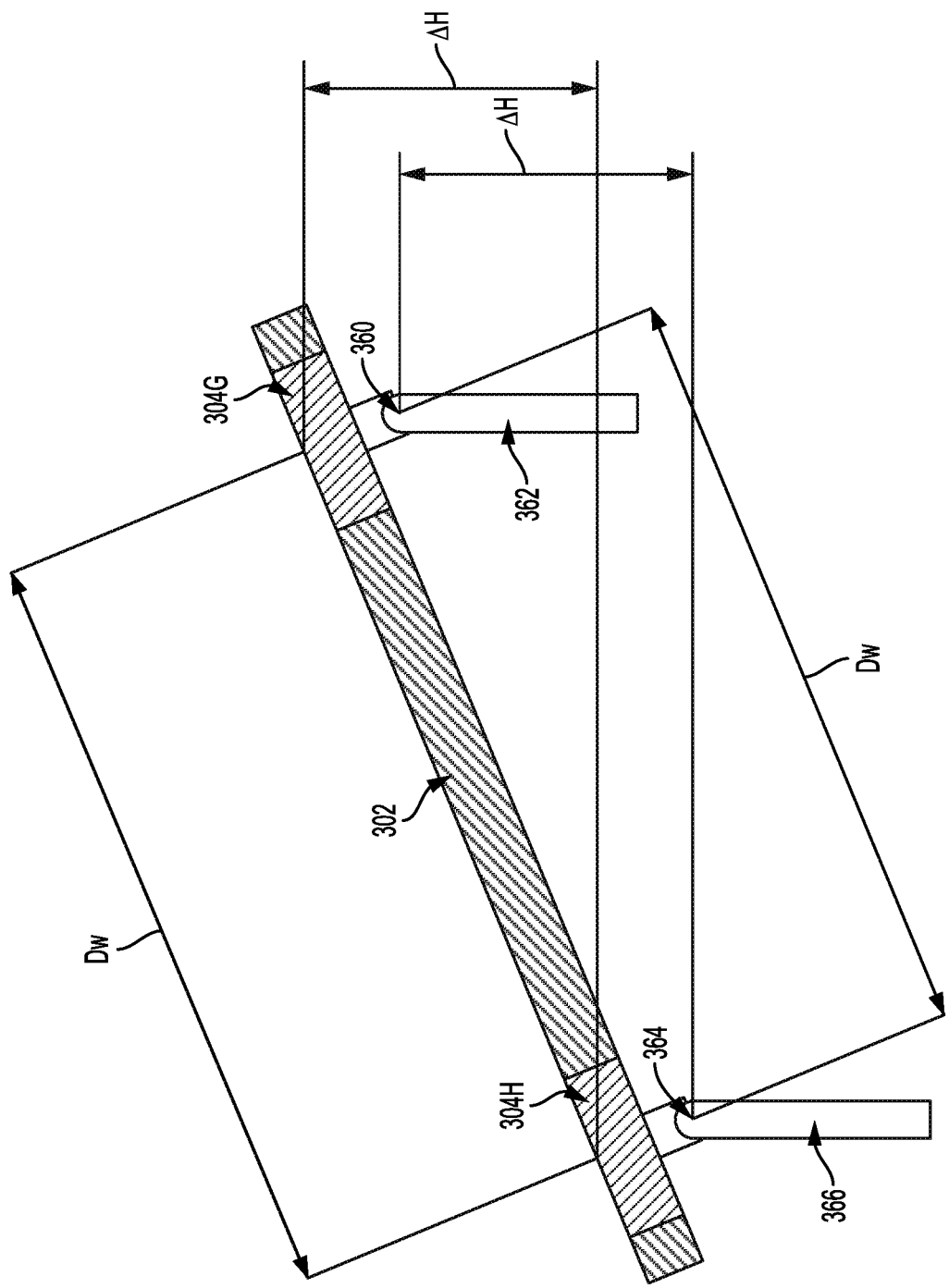
FIG. 3J illustrates a cross section of a disk showing the geometric relationships between elements of the apparatus illustrated in FIGS. 3A-3B, in accordance with an example implementation.

FIGS. 3H, 3I, and 3J illustrate geometric relationships between elements of the apparatus illustrated in FIGS. 3A-3B, in accordance with an example implementation. The disk 302 forms an angle θ with respect to a horizontal plane. As mentioned above, the shaft 308 and the rack gear 310, which forms an end of the shaft 308, are coupled to the disk 304 and the disk 302.

The diameter of the spur gear 312 is $D_1$, and its radius is $R_1$, the diameter of the spur gear 316 is $D_2$, and its radius is $R_2$, the diameter of the ring gear 321 is $D_3$, and its radius is $R_3$. As the assembly, including the disk 302, the disk 304, the shaft 308 and rack gear 310, the spur gear 312, and the spur gear 316, makes half a revolution about the shaft 318, the shaft 308 and the rack gear 310 undergo a displacement of ΔH. The following equations define the various translations and rotations:

$$\Delta H = D_w \sin(\theta) \qquad (4)$$

where, as shown in FIGS. 3H-3J, $D_w$ is a diameter of a circle centered around a center of the disk 302 and having a radius equal to a distance from the center of the disk 302 to a center of a disk 304G In other words, as illustrated in FIG. 3J, $D_w$ is a distance from a center of the disk 304G to a center of an opposing disk 304H. This distance is the same as a respective distance between a center 360 of a shaft 362 coupled to the disk 304G and a center 364 of a shaft 366 coupled to the disk 304H.

The amount of rotation (i.e., angular displacement) $\alpha_1$ of the spur gear 312 can be calculated as follows:

$$\alpha_1 = \frac{\Delta H}{R_1} \quad (5)$$

Because the spur gear 316 is coupled to the spur gear 312 via the shaft 314, angular displacement of the spur gear 316 is the same as the angular displacement of the spur gear 312

$$\alpha_1 = \alpha_2 = \frac{\Delta H}{R_1} \quad (6)$$

Thus, the circumferential travel of the spur gear 316 ($\Delta C_2$) can be calculated as follows:

$$\Delta C_2 = \alpha_2 \cdot R_2 = \Delta H \cdot \left(\frac{R_2}{R_1}\right) \quad (7)$$

Because the ring gear 321 is fixed, the circumferential travel ($\Delta C_3$) of the spur gear 316 around the ring gear 321 is equal to ($\Delta C_2$). Thus, angular displacement around the ring gear 321 can be calculated as:

$$\alpha_{RingGear} = \frac{\Delta C_2}{R_3} = \pi (\text{radians}) \quad (8)$$

The relationship between $D_w$, the angle $\theta$, and the gear radii is as follows:

$$D_w \cdot \sin(\theta) \cdot \frac{R_2}{R_1} = \pi R_3 \quad (9)$$

Further, during the half revolution of the assembly about the shaft 318, the disk 304 disposed within the disk 302 travels an elliptical distance that can approximately be calculated as:

Disk Travel=$0.5 \cdot \pi \cdot D_w \cos(\theta)$ (10)

Thus, an effective gear ratio R can be calculated as:

$$R = \frac{\Delta H}{\text{Disk Travel}} = \left(\frac{D_1}{D_2}\right)\left(\frac{D_3}{D_4}\right) \quad (11)$$

where $D_4 = D_w \cos(\theta)$.

Similar to the apparatus 200, energy in the pressurized fluid acting on the disks 304 and 330 is converted into mechanical motion of the disk 304. As the disk 304 is repelled under pressure, volume of fluid above the disk 304 remains substantially the same or changes infinitesimally. Such an infinitesimal volume change (e.g., fluid volume changes by less than 5%) accounts for any infinitesimal linear movement of the disk 304 within a thickness of the disk 302.

c. Plate Rotating on a Cylindrical Drum Implementation

Figure 4A:
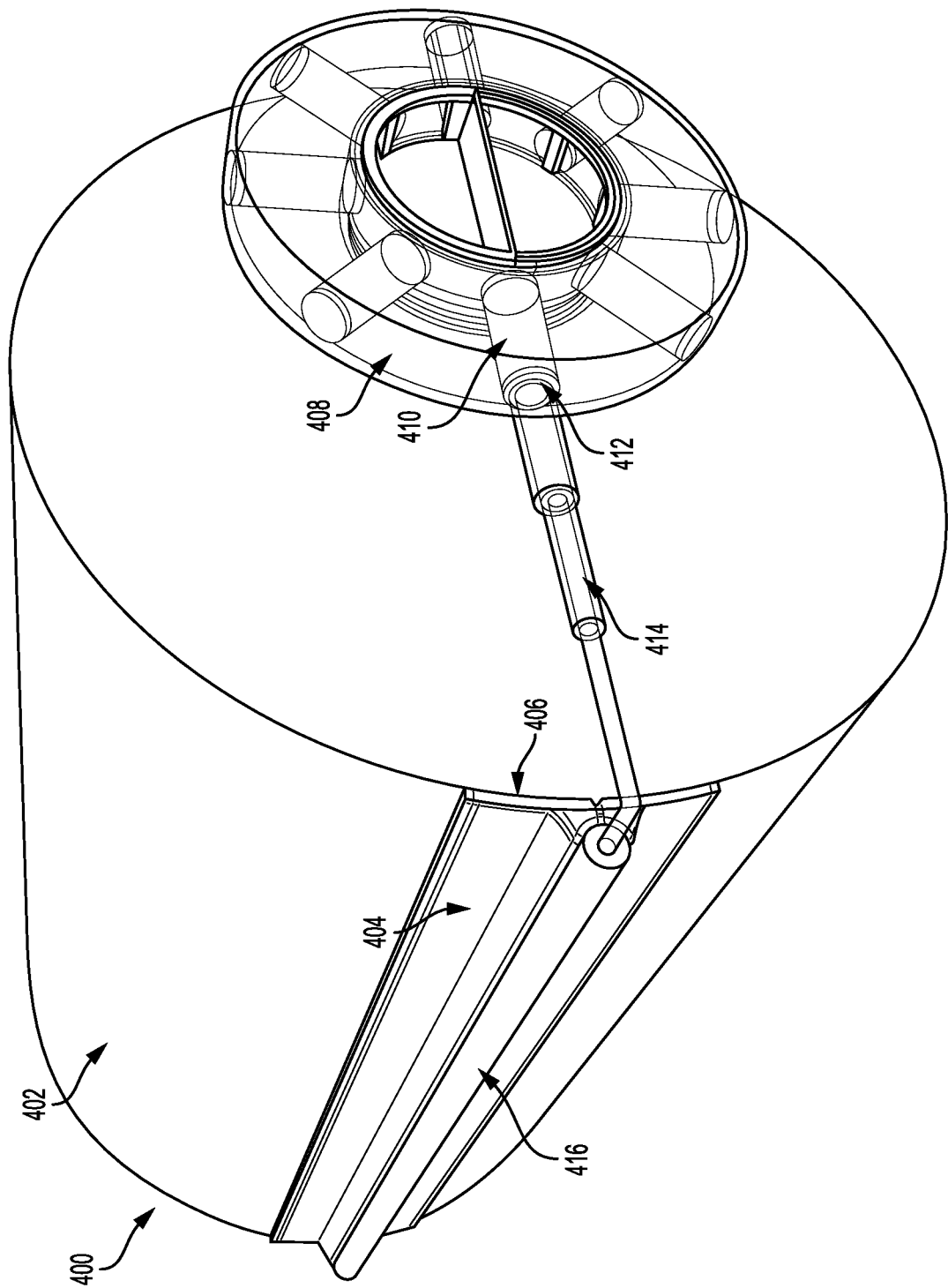
FIG. 4A illustrates a partial perspective view of another apparatus for converting fluid pressure to mechanical motion, in accordance with an example implementation.
Figure 4B:
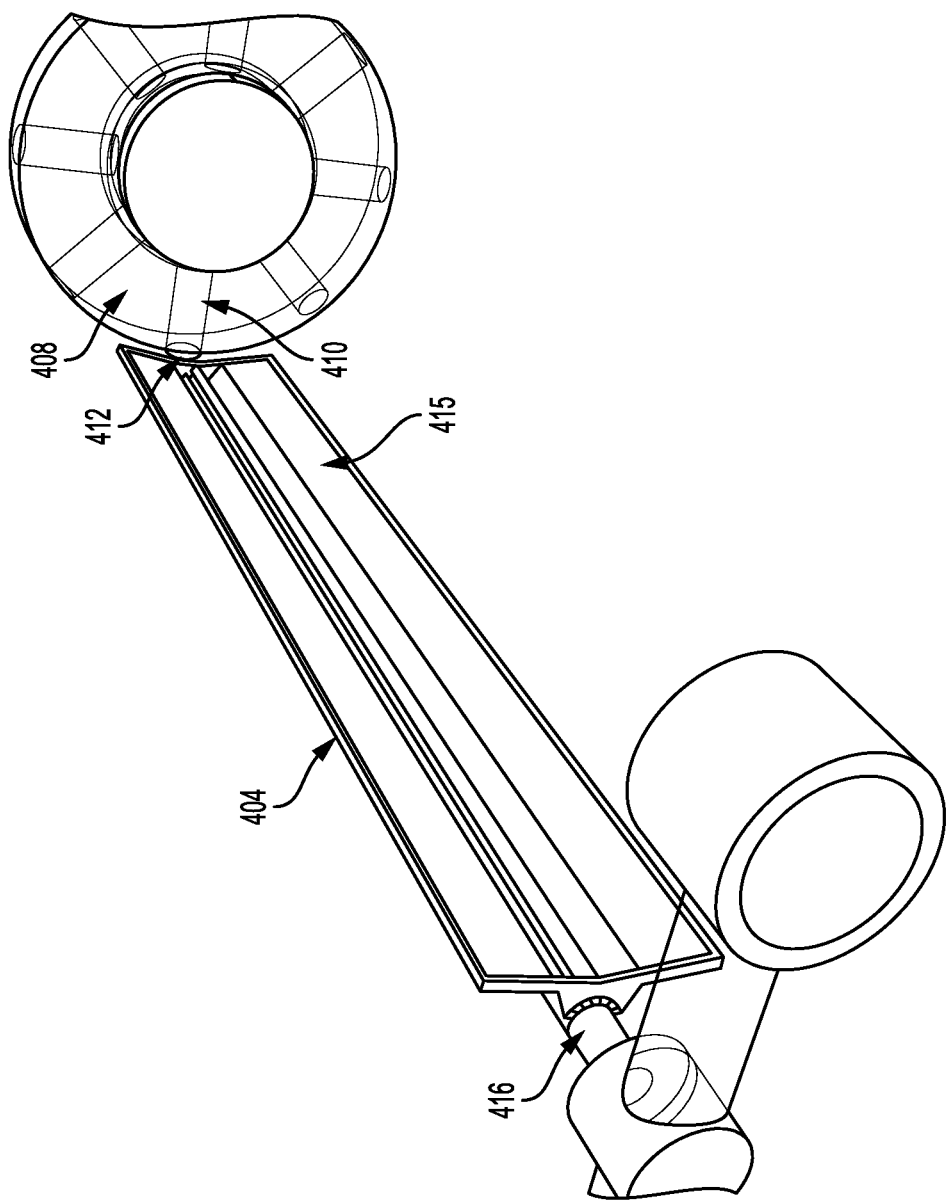
FIG. 4B illustrates a partial perspective view of the apparatus of FIG. 4A without a drum, in accordance with an example implementation.
Figure 4C:
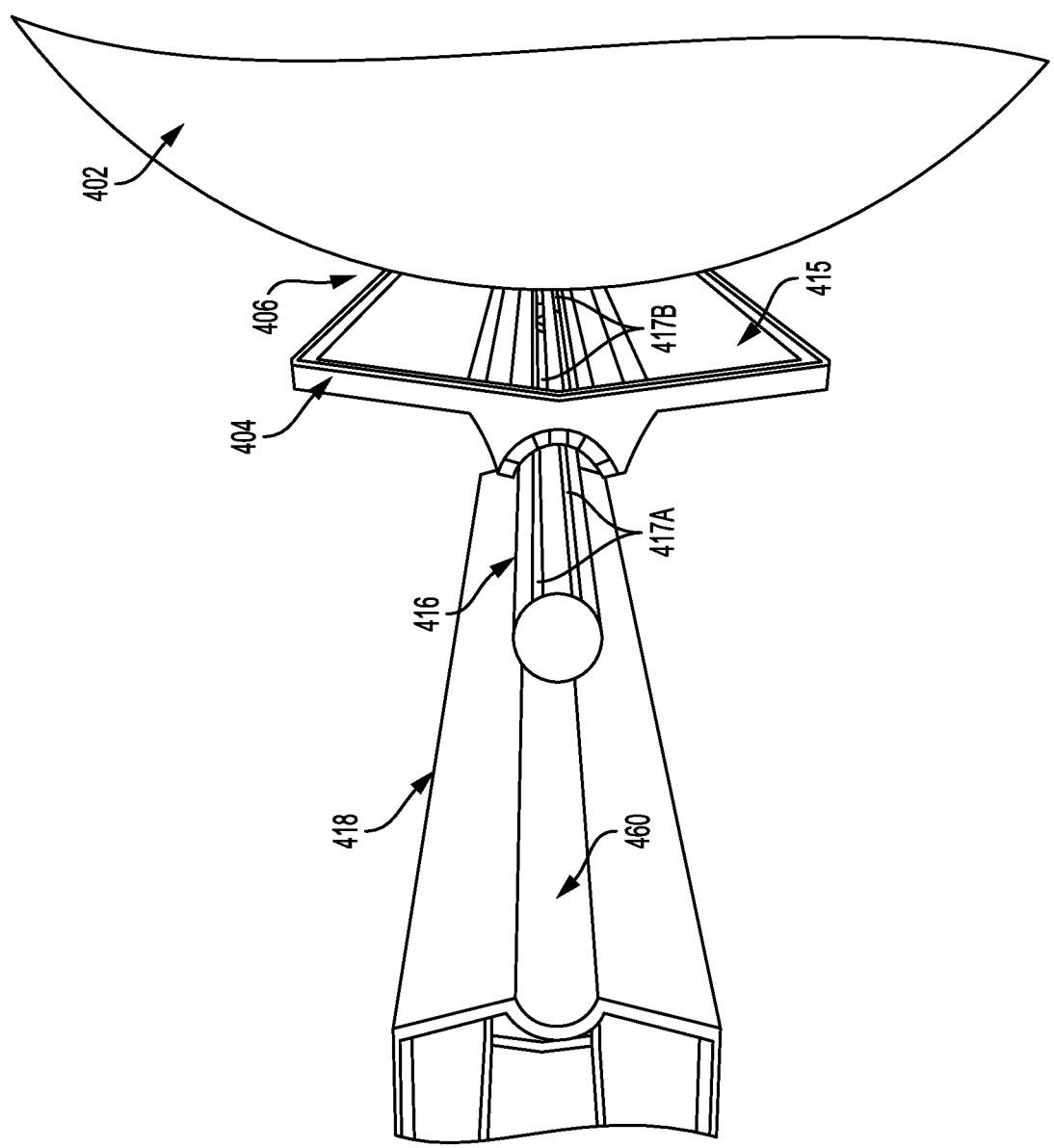
FIG. 4C illustrates is an exploded view of a portion of the apparatus of FIG. 4A including a drum, a plate, and an elbow, in accordance with an example implementation.
Figure 4D:
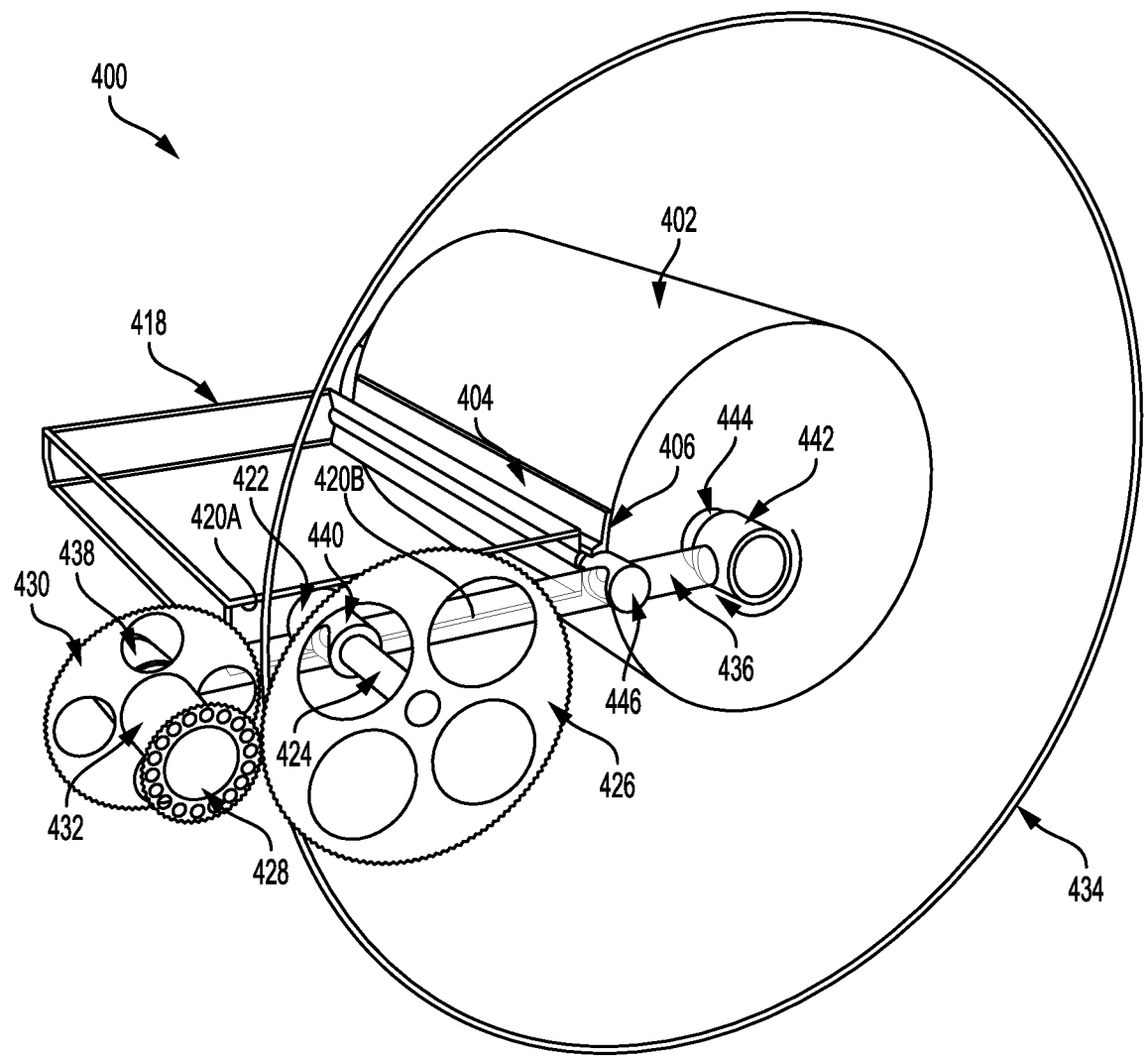
FIG. 4D illustrates a perspective view of the apparatus of FIG. 4A with a rack gear and gear train at a particular rotary position, in accordance with an example implementation.
Figure 4E:
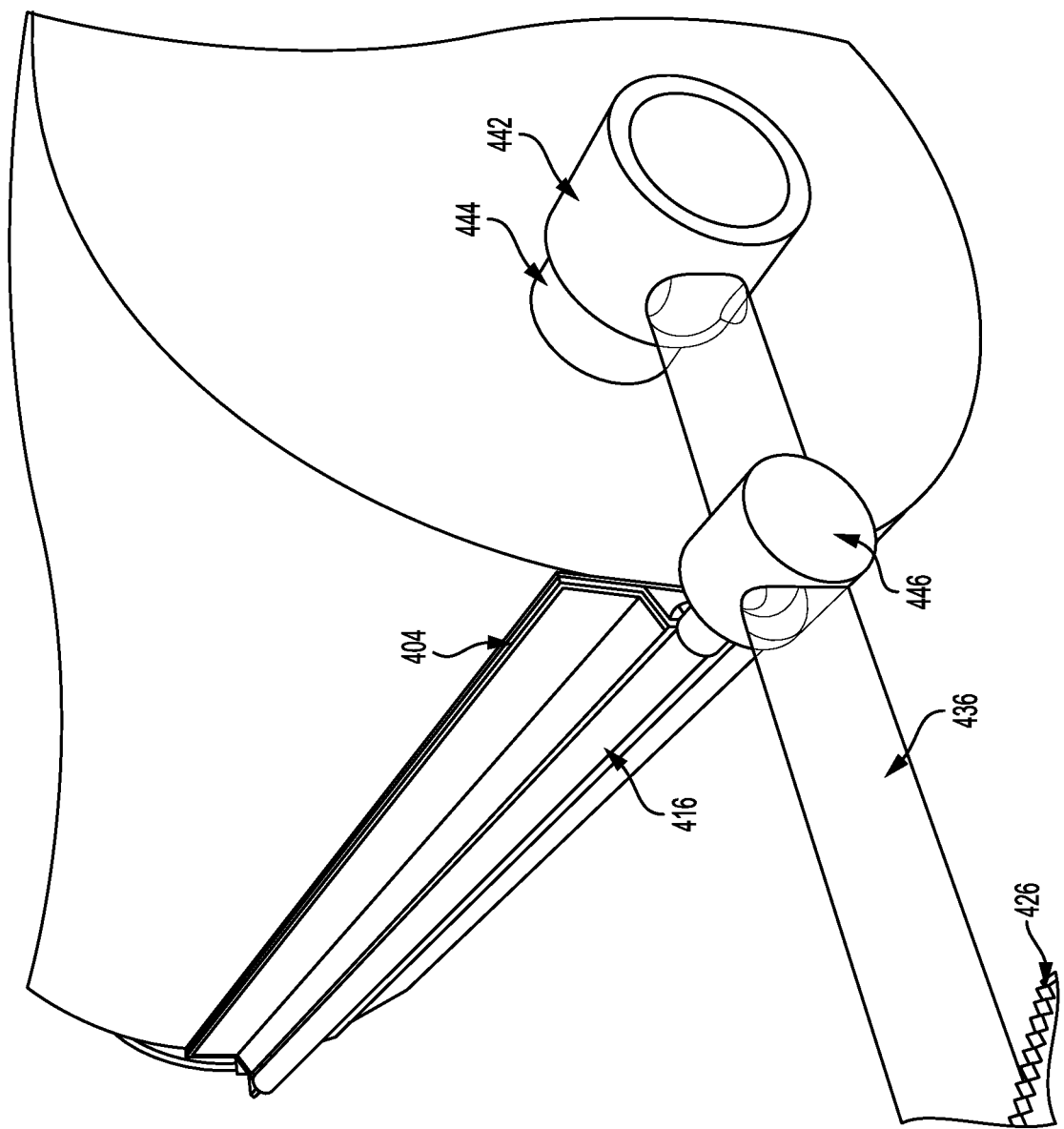
FIG. 4E illustrates a zoomed-in view of a slide support, an elbow, and an arm, in accordance with an example implementation.
Figure 4G:
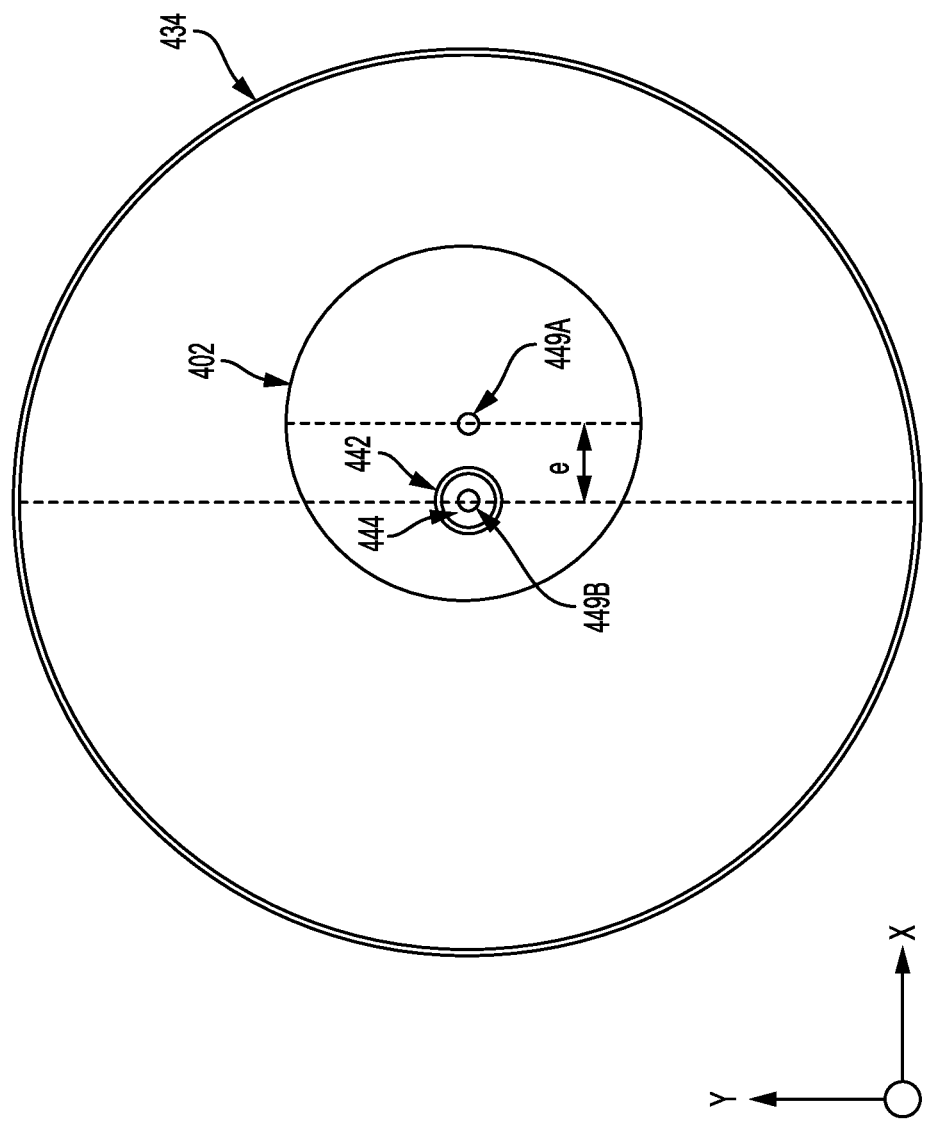
FIG. 4G illustrates eccentric disposition of a drum relative to a ring gear, in accordance with an example implementation.
Figure 4H:
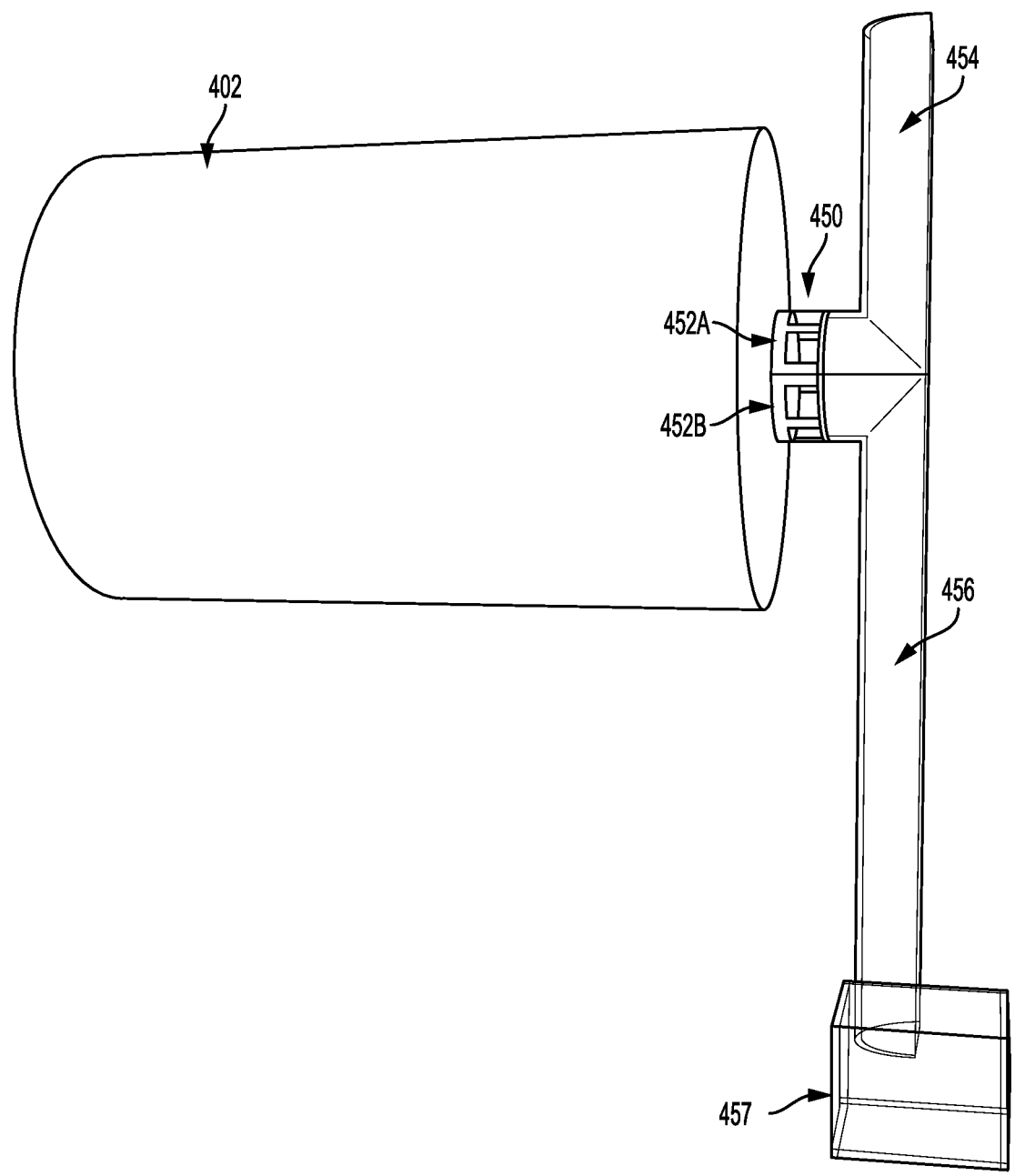
FIG. 4H illustrates an inner drum split into a high pressure section and a low pressure section, in accordance with an example implementation.
Figure 4I:
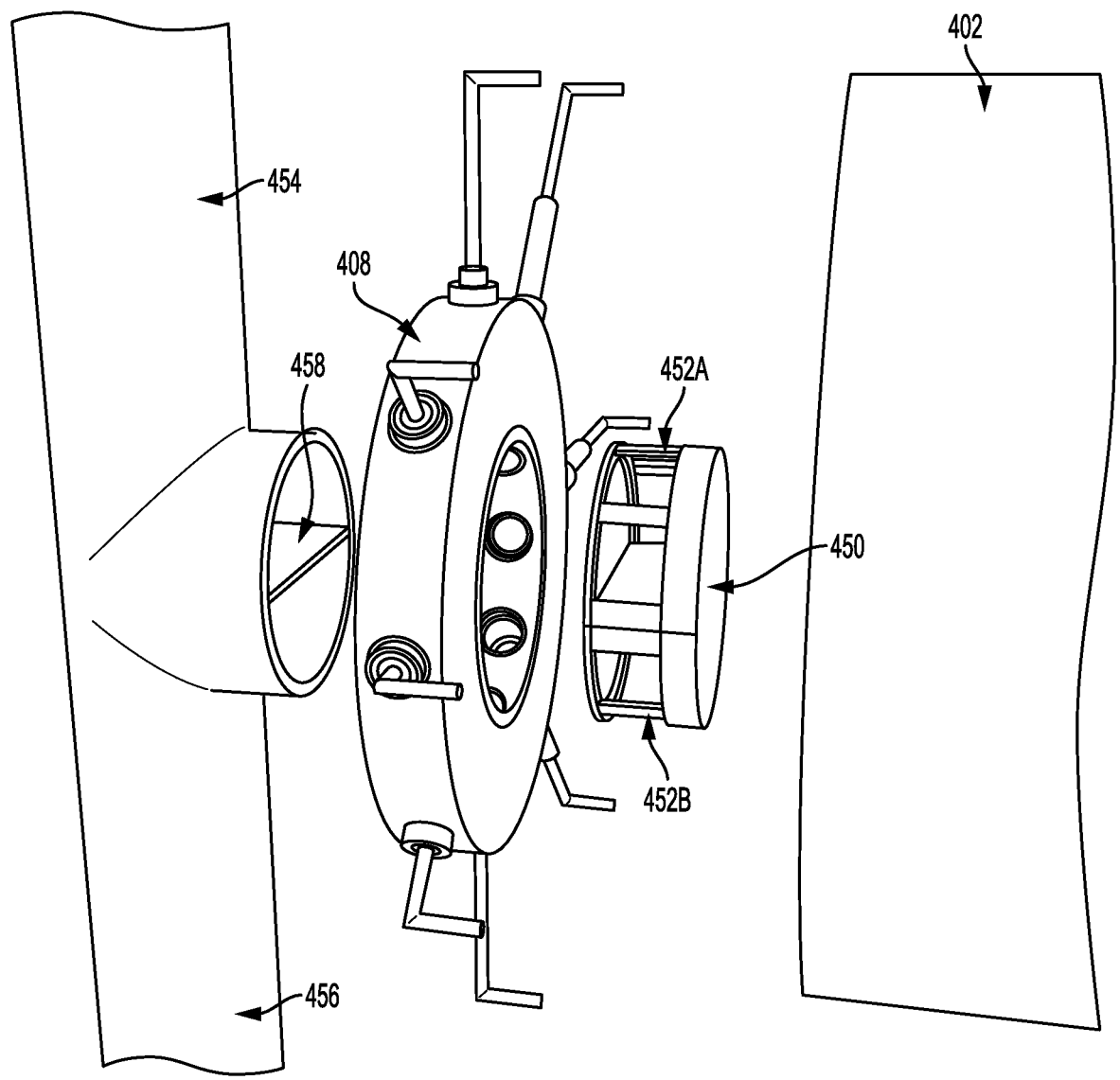
FIG. 4I illustrates an exploded view showing a drum, an inner drum, a manifold, and a pipe system, in accordance with an example implementation.
Figure 4J:
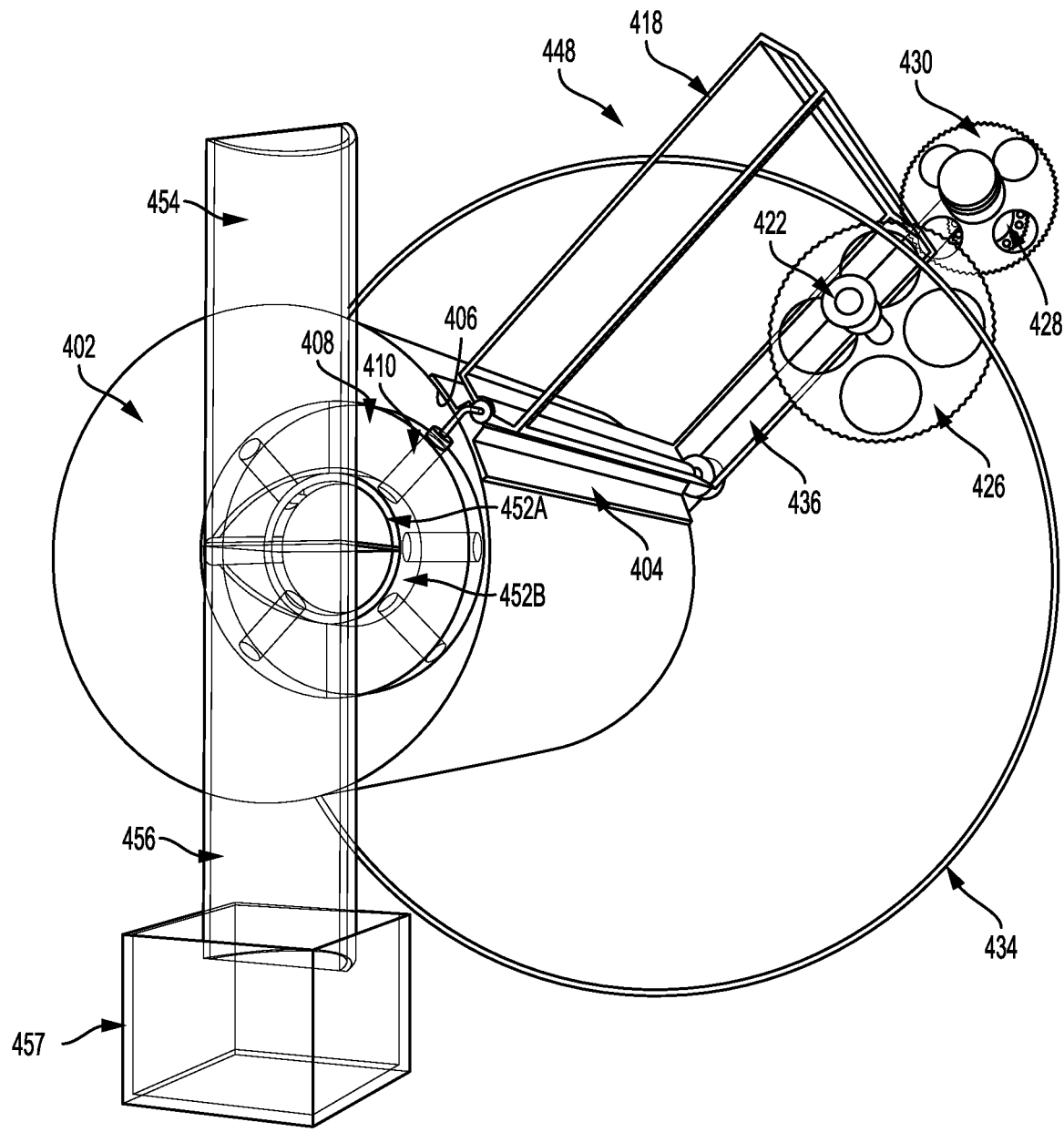
FIG. 4J illustrates another perspective view of the apparatus illustrated in FIGS. 4A-4I, in accordance with an example implementation.
Figure 4K:
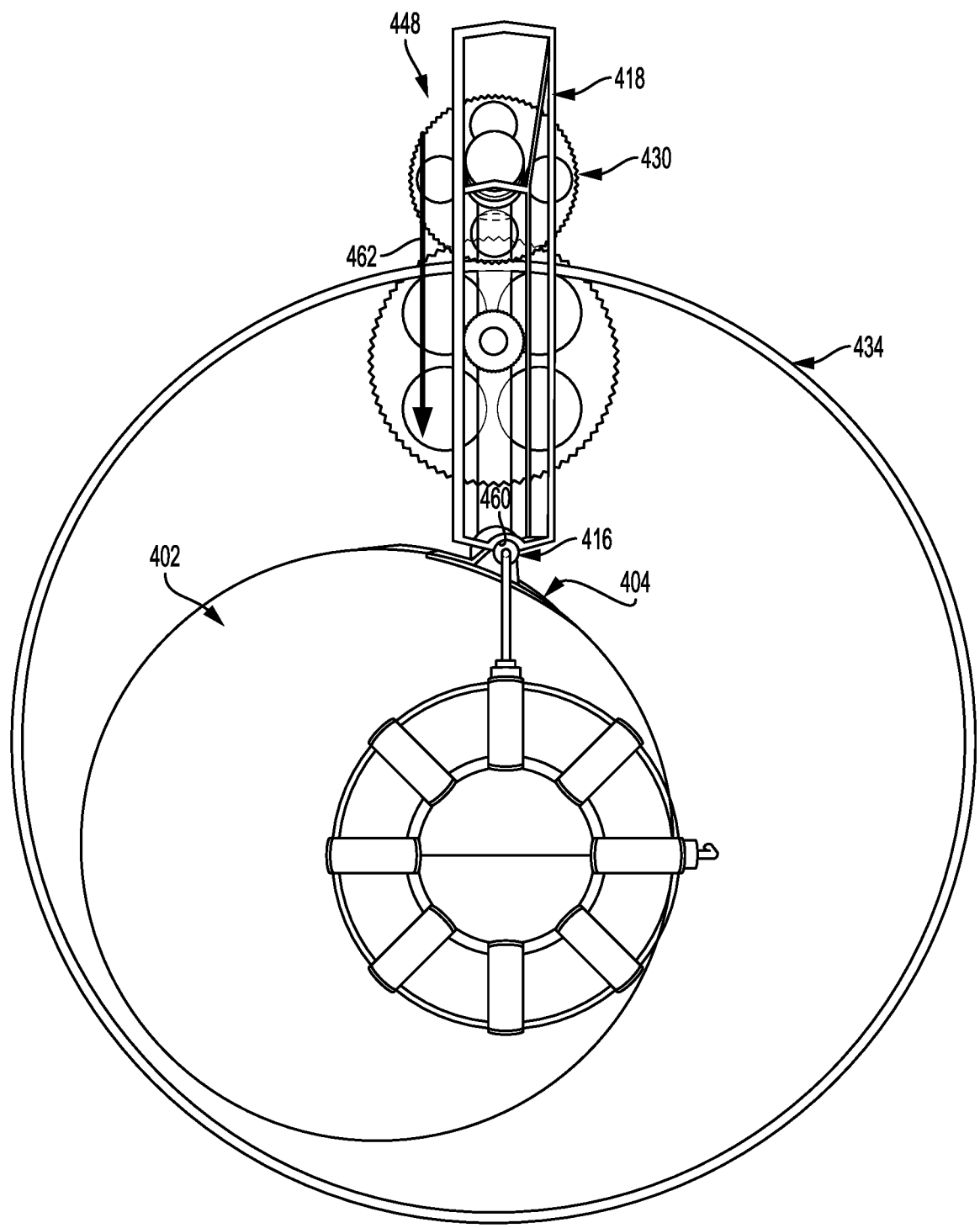
FIG. 4K illustrates rotation of a rack gear relative to a plate, in accordance with an example implementation.
Figure 4L:
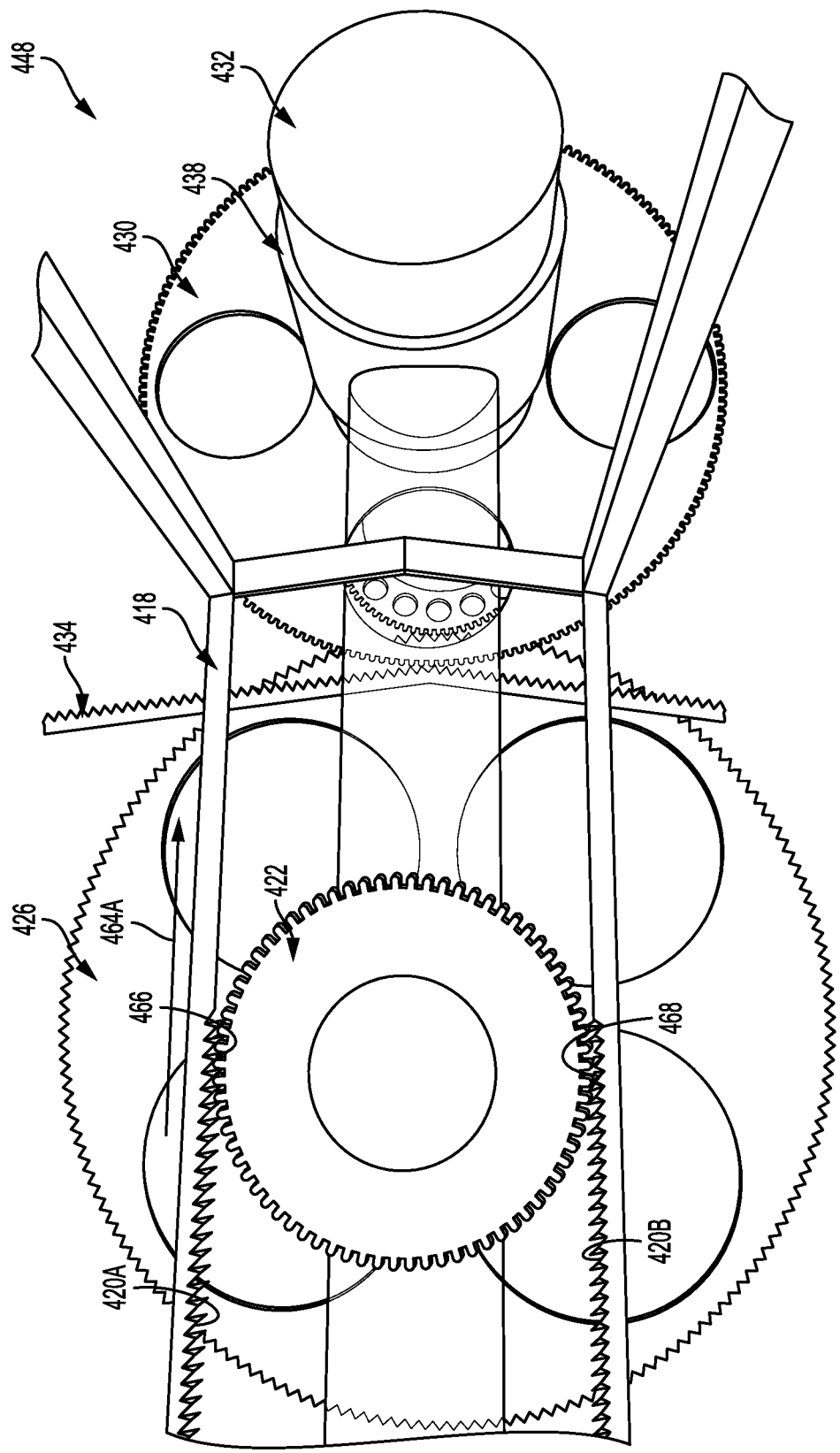
FIG. 4L illustrates a spur gear disposed within a rack gear having two opposite inner surfaces when the rack gear is at a first rotational position, in accordance with an example implementation.
Figure 4M:
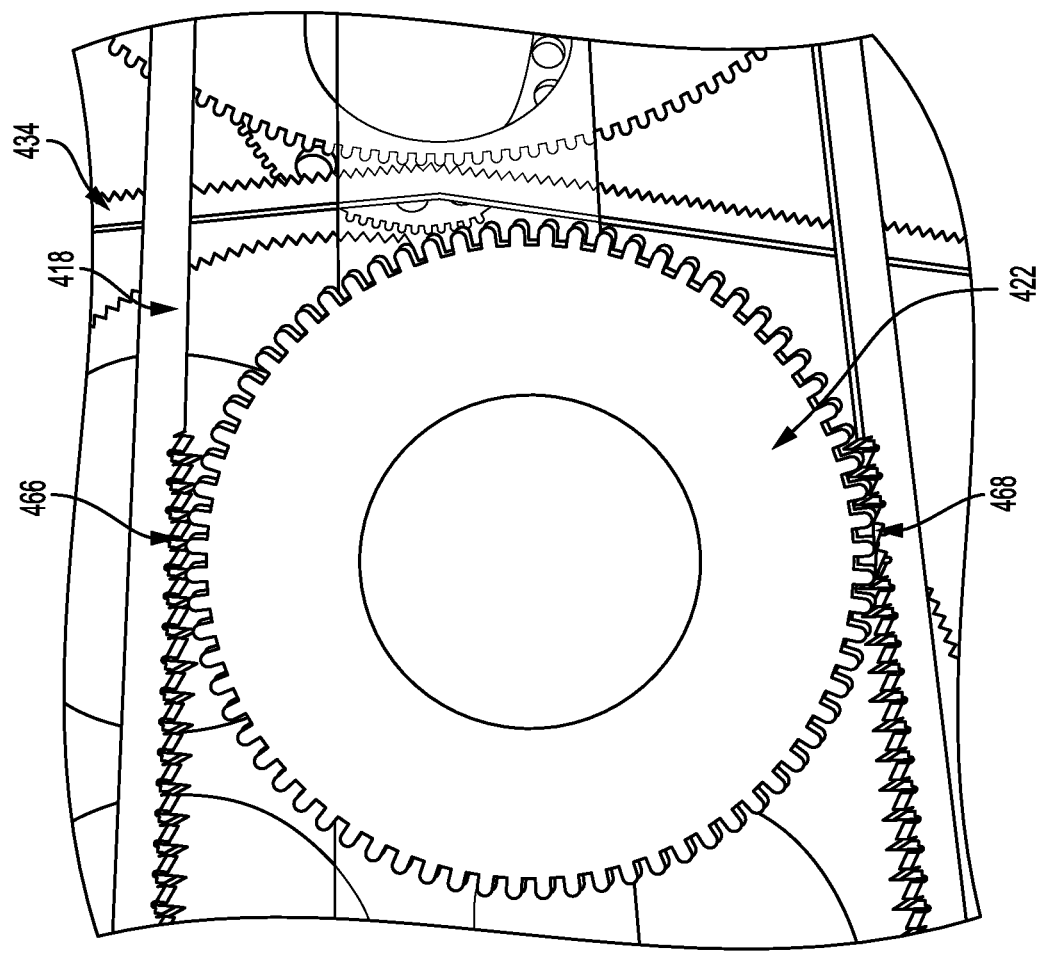
FIG. 4M illustrates hinged teeth disposed on the two opposite inner surfaces shown in FIG. 4L, in accordance with an example implementation.
Figure 4N:
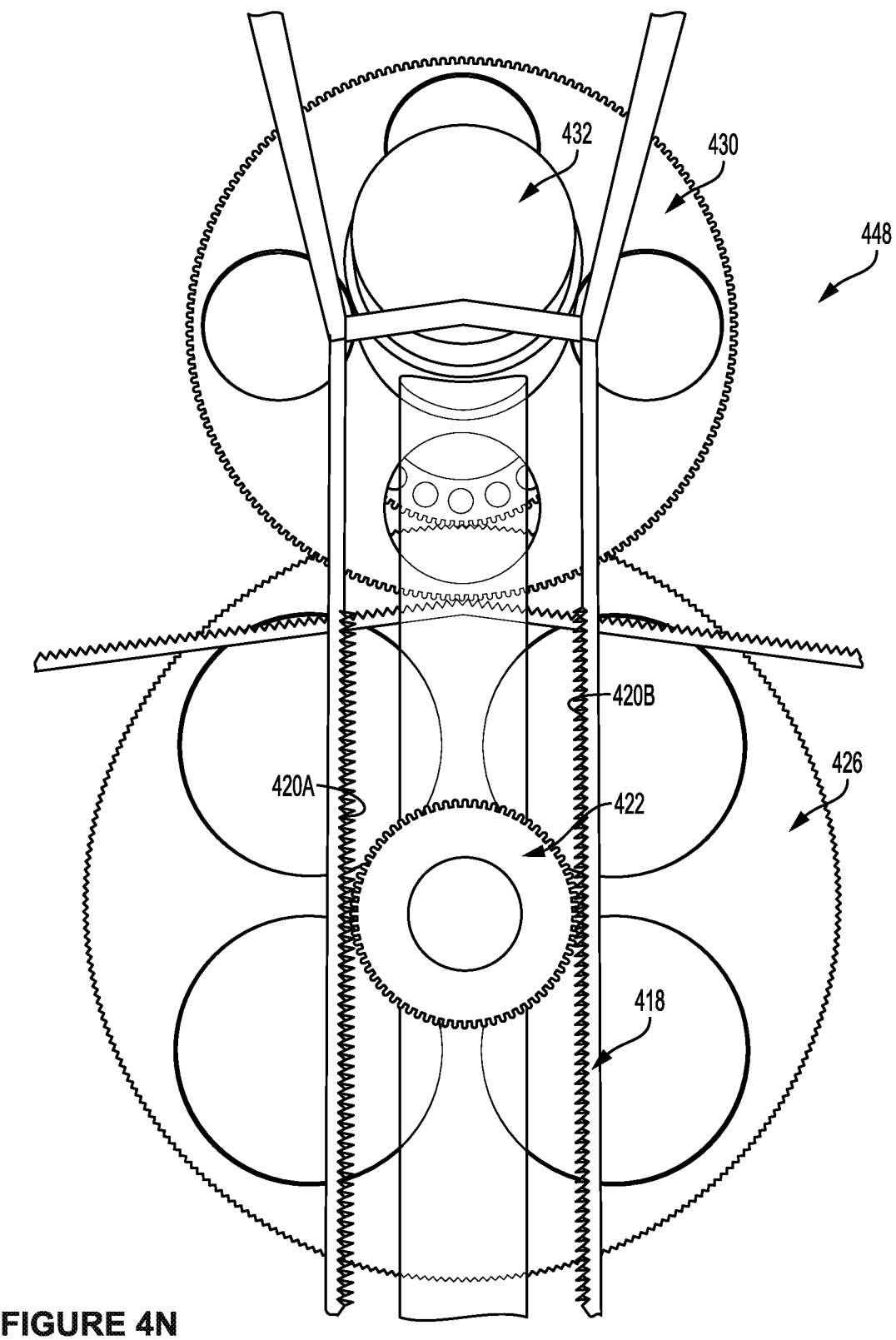
FIG. 4N illustrates the spur gear of FIG. 4L disposed within the rack gear when the rack gear is at a second rotational position, in accordance with an example implementation.
Figure 4O:
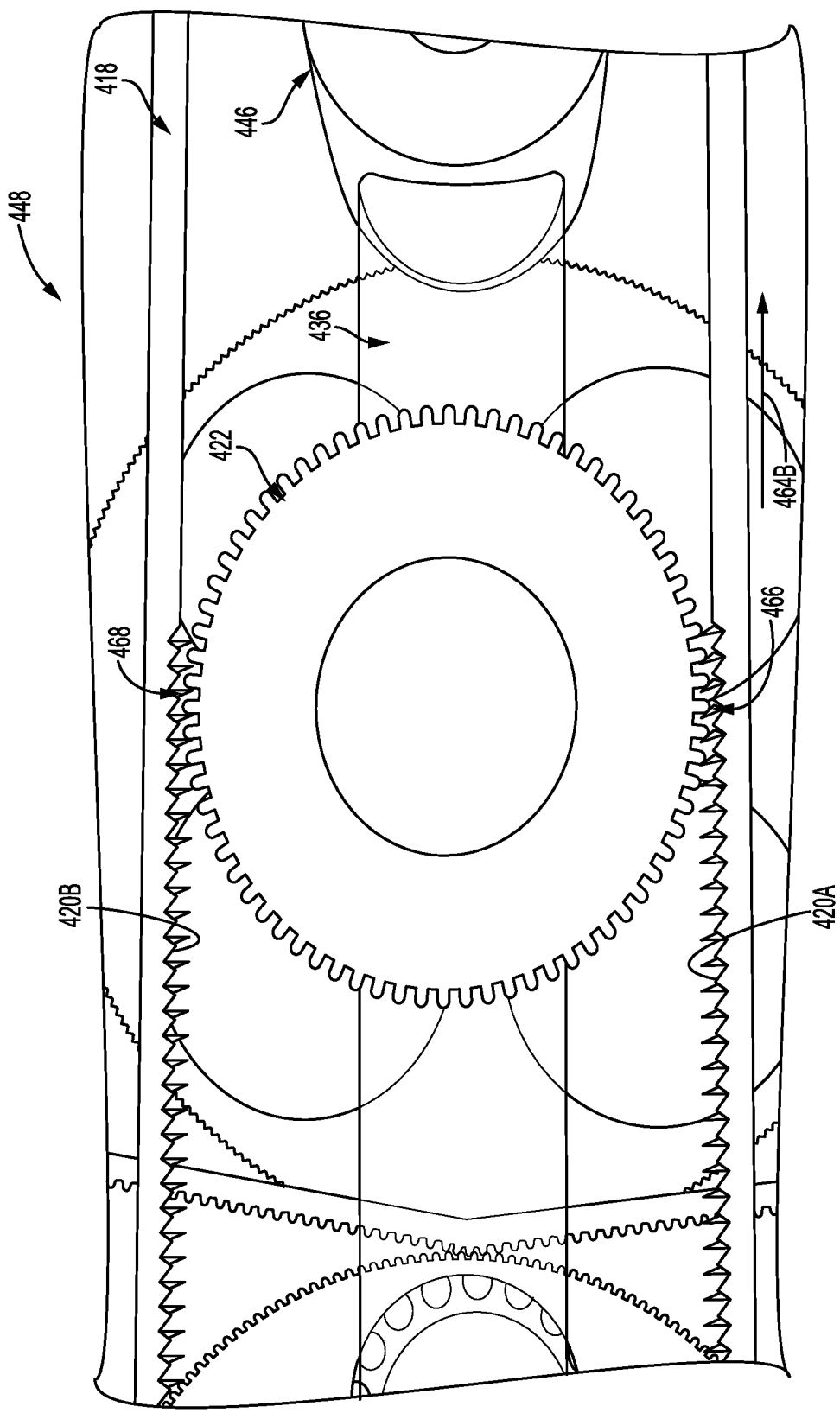
FIG. 4O illustrates the spur gear of FIG. 4L disposed within the rack gear when the rack gear is at a third rotational position, in accordance with an example implementation.
Figure 4P:
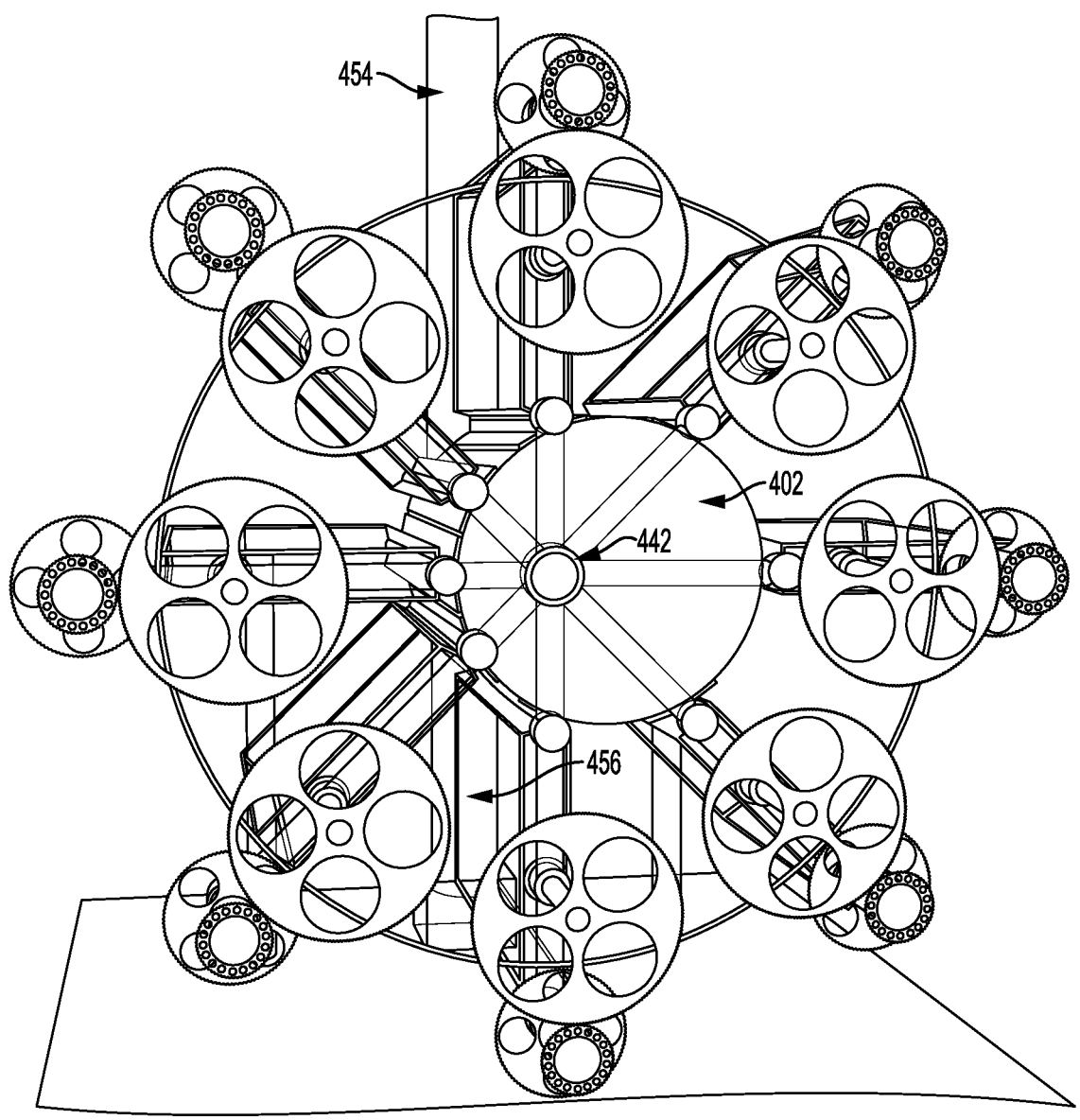
FIG. 4P illustrates the apparatus of FIGS. 4A-4O having multiple plates and associated assemblies, in accordance with an example implementation.
Figure 4Q:
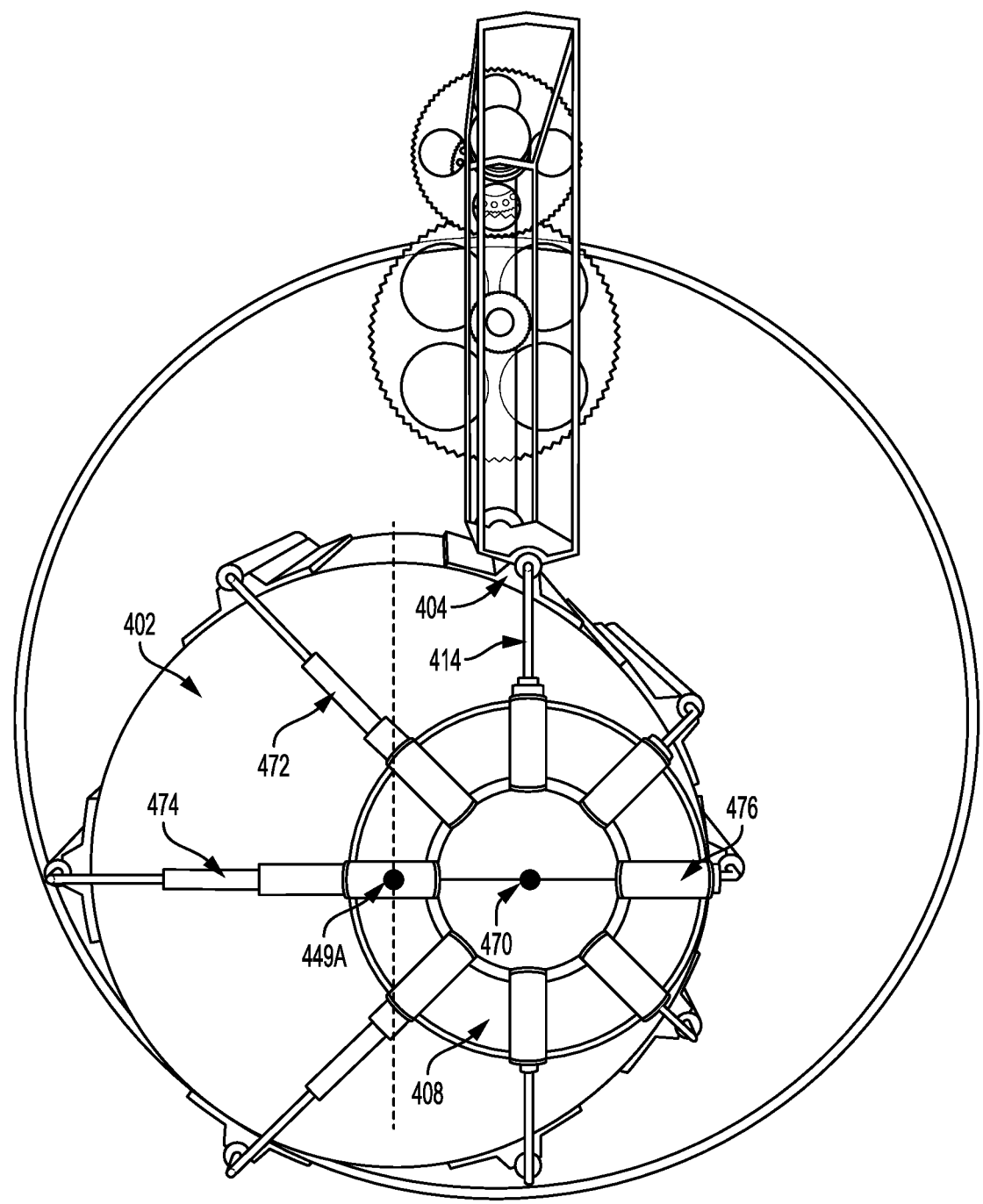
FIG. 4Q illustrates telescopic cylinders connecting a manifold to respective plates, in accordance with an example implementation.
Figure 4R:
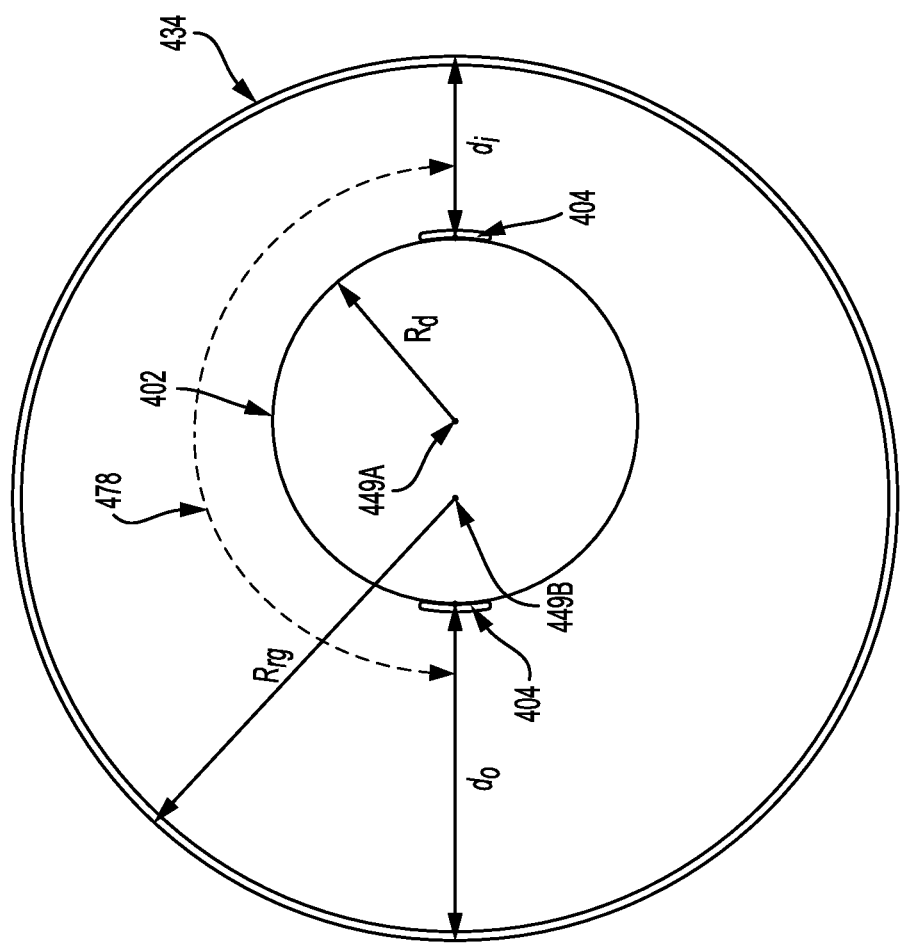
FIG. 4R illustrates geometric relationships between a drum and a ring gear, in accordance with an example implementation.

FIGS. 4A-4R illustrate another apparatus 400 for converting fluid energy to mechanical motion, in accordance with an example implementation. Particularly, FIG. 4A illustrates a partial perspective view of the apparatus 400, in accordance with an example implementation. FIG. 4A shows a cylindrical drum 402 and a plate 404 configured to rotate along a surface of the drum 402. A gap 406 separates the plate 404 from an underlying surface of the drum 402. The apparatus 400 may include multiple plates similar to the plate 402 as described below at FIG. 4P.

A pipeline manifold 408 includes a pipe system branching into several openings feeding fluid to the plates such as the plate 402. For instance, a pipe or branch 410 of the manifold 408 has an opening 412 coupled to a telescopic supply cylinder 414 configured to communicate fluid at alternating pressures to a knuckle or elbow 416. Fluid delivered to the elbow 416 is communicated to the gap 406 through channels in the elbow 416 and corresponding channels in the plate 404.

FIG. 4B illustrates a partial perspective view of the apparatus 400 without the drum 402, in accordance with an example implementation. FIG. 4B particularly illustrates communicating fluid from the elbow 416 to the gap 406. Fluid delivered through the opening 412 is communicated through a channel in the elbow 416. This channel in the elbow 416 is exposed, and delivers the fluid, to a back side 415 of the plate 404, and thus to the gap 406 separating the plate 404 from the drum 402.

FIG. 4C illustrates is an exploded view of a portion of the apparatus 400 including the drum 402, the plate 404, and the elbow 416, in accordance with an example implementation. As shown in FIG. 4C, the elbow 416 includes grooves/channels 417A, and the plate 404 includes corresponding channel openings 417B. Thus, fluid delivered to the elbow 416 via the telescopic supply cylinder 414 flows through the channels 417A, then is communicated to the channel openings 417B, and is ultimately delivered to the gap 406.

FIG. 4D illustrates a perspective view of the apparatus of FIG. 4A with a rack gear 418 and gear train at a particular rotary position, in accordance with an example implementation. The manifold 408 is mounted on one side of the drum 402. The view shown in FIG. 4D is for the other side of the drum 402. Thus, FIG. 4D does not show the manifold 408.

As shown in FIG. 4D, the plate 404 is coupled to a structure that is referred to herein as the rack gear 418. Inner surfaces 420A and 420B of the rack gear 418 include rack gear teeth. Gear teeth of the inner surfaces 420A and 420B engage a spur gear 422. The spur gear 422 is coupled via a shaft 424 to another spur gear 426.

The spur gear 426 engages another spur gear 428, which is coupled to another spur gear 430 via a shaft 432. Thus, the spur gears 422 and 426 form a first compound gear configured to rotate at a first rotational speed, and the spur gears 428 and 430 form a second compound gear configured to rotate at a second rotational speed. Further, the spur gear 430 engages external teeth of a fixed rack ring gear 434.

The shaft 432 extends beyond the spur gear 430 and is coupled to an arm 436 via a bushing 438. The arm 436 is also coupled to the shaft 424 via a bushing 440. The arm 436 is further coupled to a bushing 442 disposed, and is configured to rotate, about a shaft 444 protruding from the side of the drum 402. The side of the drum 402 from which the shaft 444 protrudes is opposite to the side of the drum 402 on which the manifold 408 is mounted.

As shown in FIG. 4E, the elbow 416 is coupled to a slide support 446 configured to slidably support the arm 436. FIG. 4E illustrates a zoomed-in view of the slide support 446, the elbow 416, and the arm 436, in accordance with an example implementation. As described below, the shaft 444 is disposed at a center of the ring gear 434, which is eccentric to a center of the drum 402. Thus, as the plate 404 rotates about the surface of the drum 402, a distance between the plate 404 and the center of the shaft 444 varies. To accommodate this variation, the arm 436 is configured to slide within the slide support 446. In other words, the slide support 446 enables the elbow 416, the plate 404, and the rack gear 418 to slide along the arm 436 as they rotate about the drum 402.

FIG. 4F illustrates another perspective view of the apparatus 400 as shown in FIG. 4D, in accordance with an example implementation. If high pressure fluid is delivered to the gap 406 between the plate 404 and the drum 402, the plate 404 and the drum 402 may interact and operate similar to the plate 202 and the inclined surface 220. Particularly, high pressure fluid in the gap 406 may repel the plate 404 away from the underlying surface of the drum 402. The repelled plate 404 causes the rack gear 418 to move outward infinitesimally. Consequently, the gear-teethed inner surface 420A causes the spur gear 422 to rotate counter-clockwise, and thus the spur gear 426 to also rotate counter-clockwise.

Rotation of the gear 426 counter-clockwise causes the spur gear 428 to rotate clockwise. The spur gear 430 coupled to the spur gear 428 therefore also rotates clockwise. As the spur gear 430 rotates, and because the ring gear 434 is fixed, an assembly 448 including the plate 404, the rack gear 418, the gear train including gears 422, 426, 428, and 430 along with the arm 436 rotate clockwise about the ring gear 434.

FIG. 4G illustrates eccentric disposition of the drum 402 relative to the ring gear 434, in accordance with an example implementation. Particularly, FIG. 4G illustrates eccentricity between a center 449A of the drum 402 and a center 449B of the ring gear 434, which is also the center of the shaft 444 surrounded by the bushing 442. As shown in FIG. 4Q the center 449B of the ring gear 434 is offset from the center 449A of the drum 402 in an x-axis direction. The offset in the x-axis direction is labelled "e." This eccentricity allows the arm 436 to rotate clockwise with the spur gear 430 maintaining its engagement with the ring gear 434, while the gear 422 translates within the rack gear 418 as described in more details below with respect to FIGS. 4L-4O).

FIG. 4H-4J illustrate delivering fluid at alternating pressure to the gap 406, in accordance with an example implementation. Specifically, FIG. 4H illustrates an inner drum 450 split into a high pressure section 452A and a low pressure section 452B. The inner drum 450 is coupled to the drum 402, and thus the inner drum 450 is stationary like the drum 402. The high pressure section 452A is configured to be in fluid communication with high pressure fluid 454, whereas the low pressure section 452B is configured to be in fluid communication with a low pressure fluid 456. For instance, the high pressure fluid 454 may be supplied via a pipe system in communication with a high pressure fluid source (e.g., a pump or accumulator configured to supply fluid at a high pressure). The low pressure fluid 456 may be fluid maintained at atmospheric pressure or fluid that is in communication with a low pressure reservoir 457 containing fluid at a pressure lower than pressure of the high pressure fluid source.

In other examples, the high pressure fluid source may be configured to provide fluid at atmospheric pressure, while pressure of fluid in the low pressure fluid 457 could be artificially lowered (e.g., by a bladder causing negative pressure). It is the differential pressure between the high pressure fluid 454 and the low pressure fluid 456 that enables the apparatus 400 to operate. Thus, as examples, the high pressure fluid 454 may have a pressure of 1000-3000 pounds per square inches (psi), while the low pressure fluid 456 may have a pressure of ≅0 psi. In other examples, the high pressure the high pressure fluid 454 may have a pressure of 100 psi, while the low pressure fluid 456 may have a pressure of ≅−50 psi. These numbers and ranges are examples for illustration only, and other pressure ranges are possible as well.

FIG. 4I illustrates an exploded view showing the drum 402, the inner drum 450, the manifold 408, and a pipe system communicating the high pressure fluid 454 and the low pressure fluid 456 to the inner drum 450, in accordance with an example implementation. The high pressure section 452A of the inner drum 450 is isolated from the low pressure section 452B. Additionally, as shown in FIG. 4I, a separator 458 segregates a pipe containing the high pressure fluid 454 from a respective pipe containing the low pressure fluid 456.

FIG. 4J illustrates another perspective view of the apparatus 400 illustrated in FIGS. 4A-4I, in accordance with an example implementation. The manifold 408 is configured to rotate with the assembly 448 relative to the drum 402 and the inner drum 450. As shown in FIG. 4J, at a particular rotational position of the manifold 408, a subset of its branches, such as the branch 410 is exposed to the high pressure fluid 454 communicated to the high pressure section 452A of the inner drum 450. At this rotational position, high pressure fluid is supplied to the gap 406, thus repelling the plate 404 and causing rotation of the assembly 448, which includes the plate 404, the rack gear 418, the gear train including gears 422, 426, 428, and 430 along with the arm 436.

At another rotational position, however, the branch 410 may be exposed to the low pressure fluid 456 from the low pressure section 452B. Thus, the manifold 408 is configured to provide fluid at alternating pressure, i.e., either high pressure fluid or low pressure fluid, based on the rotational position of the manifold 408 relative to the inner drum 450.

In other example implementations, instead of rotating the manifold 408 to alternate between providing high pressure fluid and low pressure fluid, a valve system could be used to selectively provide high pressure fluid or low pressure fluid to the gap 406. For instance, both the source of high pressure fluid and the reservoir 457 could be ported to a spool valve. Linear position of a spool disposed within a body of the spool valve determines or selects whether to deliver fluid from the source of high pressure fluid or from the reservoir 457 to the gap 406. IN this example, the manifold 408 could be stationary. In the description below, the implementation involving rotation of the manifold 408 is used as example to illustrate operation of the apparatus 400, but other implementations could be used as well.

FIG. 4K illustrates rotation of the rack gear 418 relative to the plate 404, in accordance with an example implementation. The plate 404 complies to the surface of the drum 402, while the spur gear 430 remains engaged to the ring gear 434 forcing the rack gear 418 to rotate relative to the elbow 416. FIG. 4K, and also FIG. 4C, shows that the elbow 416 is cylindrical in shape, and that the rack gear 418 has a semi cylindrical surface 460 that complies with the surface of the elbow 416. This configuration allows the rack gear 418 to rotate relative to, or about, the elbow 416 as the assembly 448 rotates thus reconciling compliance of the plate 404 to the surface of the drum 402 with the spur gear 430 remaining engaged to the ring gear 434.

In examples, additional components could be added to the apparatus 300 to control a magnitude of the gap 406 (distance between a surface of the drum 402 and the plate 404) and orientation of the plate 404. For instance, a gearing mechanism could be implemented to maintain tangential orientation of leading and tailing edges of the plate 404 relative to the surface of the drum 402. In another example, magnets could be incorporated in the leading and tailing edges of the plate 404 to help maintain a particular magnitude of the gap 406.

FIG. 4K further illustrates eccentric positioning of the drum 402 relative to the ring gear 434 as described above with respect to FIG. 4G However, FIG. 4K illustrates a view from a perspective of a side that includes the manifold 408, whereas FIG. 4G illustrates a view form a perspective of a side that includes the shaft 444 and the arm 436. As mentioned above, the eccentricity allows the spur gear 422 to travel within the rack gear 418 as the rack gear 418 rotates with the plate 404 about the drum 402. Particularly, when the assembly 448 is at a 9 O'clock position illustrated in FIGS. 4D and 4F, the spur gear 422 is at its outermost position farthest from the drum 402. At a 3 O'clock position, the spur gear 422 is at its innermost position closest to the drum 402. The 9 O'clock position and the 3 O'clock position are described herein for a viewer of FIGS. 4D and 4F, i.e., a viewer looking at the side of the drum 402 that has the shaft 444.

As the assembly 448 travels in a clockwise direction from the 9 O'clock position to the 3 O'clock position, the spur gear 422 travels within the rack gear 418 from its outermost position to its innermost position. Conversely, as the assembly 448 travels in the clockwise direction from the 3 O'clock position to the 9 O'clock position, the spur gear 422 travels within the rack gear 418 from its innermost position to its outermost position. As mentioned with respect to FIG. 4D above, as the spur gear 422 travels within the rack gear 418, it rotates, thereby causing the whole assembly 448 to rotate as the spur gear 430 rotates about the ring gear 434.

Teeth on the inner surfaces 420A and 420B of the rack gear 418 have hinged gear teeth. Thus, gear teeth disposed on the inner surface 420A engage the spur gear 422 in one direction, but are passive in the other direction. Similarly, gear teeth disposed on the inner surface 420B engage the spur gear 422 in one direction, but are passive in the other direction. However, gear teeth of the inner surface 420A are hinged in an opposite direction relative to gear teeth of the inner surface 420B. The result of this is that, regardless of the direction of travel of the spur gear 422 within the rack gear 418, the assembly 448 rotates in the same direction.

FIG. 4L illustrates the spur gear 422 disposed within the rack gear 418 when the rack gear is at a first rotational position, in accordance with an example implementation. Particularly, FIG. 4L shows the spur gear 422 disposed within the rack gear 418 between the surfaces 420A and 420B while the assembly 448 is at the 9 O'clock position depicted in FIGS. 4D and 4F. However, FIGS. 4D and 4F show a frontal perspective view of a portion of the apparatus 400, whereas FIG. 4L shows a back or posterior perspective view of the same portion. At this position, the spur gear 422 is at its outermost position and thus farthest from the drum 402.

As described with respect to FIG. 4F, high pressure fluid in the gap 406 may repel the plate 404 away from an underlying surface of the drum 402. The repelled plate 404 may consequently move infinitesimally outward, away from the underlying surface of the drum 402, thus causing the rack gear 418 to move outward, i.e., in direction of an arrow 464A shown in FIG. 4L. While moving in direction of the arrow 464A, gear teeth disposed on the surface 420A of the rack gear 418, such as tooth 466, engage the spur gear 422 and cause the spur gear 422 to rotate clockwise from the perspective of a viewer of FIG. 4L. In other words teeth disposed on the surface 420A apply a force on teeth of the spur gear 422 and cause the spur gear 422 to rotate. However, gear teeth disposed on the surface 420B of the rack gear 418, such as tooth 468, are passive, i.e., do not apply a substantial force on teeth of the spur gear 422, and they bend backward about their hinges as the spur gear 422 rotates and moves with the rack gear 418.

FIG. 4M illustrates a zoomed-in view of hinged teeth disposed on the two opposite inner surfaces 420A and 420B, in accordance with an example implementation. While the rack gear tooth 466 is upright and engages the spur gear 422, the rack gear tooth 468 is bent backward and does not hinder motion of the spur gear 422.

As the assembly 448 rotates clockwise from the position 9 O'clock illustrated in FIGS. 4D, 4F, and 4L toward the 3 O'clock position, and the spur gear 422 moves within the rack gear 418 from its outmost position toward its innermost position. FIG. 4N illustrates the spur gear 422 when the rack gear 418 is at a second rotational position, in accordance with an example implementation. In FIG. 4N, the assembly 448 is at a 12 O'clock position, i.e., between the 9 O'clock position and 3 O'clock position.

FIG. 4O illustrates the spur gear 422 disposed within the rack gear 418 when the rack gear 418 is at a third rotational position, in accordance with an example implementation. The spur gear 422 continues to move within the rack gear 418 until it reaches its innermost position close to the slide support 446 as shown in FIG. 4O, where the assembly 448 reaches the 3 O'clock position. As the assembly 448 travels clockwise from the 3 O'clock position to again reach the 9 O'clock position, the rack gear 418 moves relative to the spur gear 422 in direction of an arrow 464B. While moving in direction of the arrow 464B, gear teeth disposed on the surface 420B of the rack gear 418, such as tooth 468, engage the spur gear 422 and cause the spur gear 422 to rotate clockwise. In other words teeth disposed on the surface 420B apply a force on teeth of the spur gear 422 and cause the gear 422 to rotate. However, gear teeth disposed on the surface 420A of the rack gear 418, such as tooth 466 are passive and bend backward about their hinges as the spur gear 422 rotates.

Thus, while teeth disposed on the surface 420A engage the spur gear 422 as the assembly 448 moves from the 9 O'clock position to the 3 O'clock position, they do not engage teeth of the spur gear 422 as the assembly 448 moves from the position 3 O'clock position to the 9 O'clock position. Similarly, while teeth disposed on the surface 420B engage the spur gear 422 as the assembly 448 moves from the position 3 O'clock to the 9 O'clock position, they do not engage teeth of the spur gear 422 as the assembly 448 moves from the 9 O'clock position to the 3 O'clock position. In this manner, regardless of the rotational position of the assembly 448, the spur gear 422 rotates in the same direction, thereby causing the assembly 448 to rotate in the same direction about the ring gear 434.

In examples, in addition to fluid pressure causing the plate 404 to be repelled away from the underlying surface of the drum 402, the plate 404 and the drum 402 could be magnetized. Particularly, from the 9 O'clock to the 3 O'clock position, the pate 404 and the underlying surface of the drum 402 could be magnetized to have the same poles, causing the plate 404 to be repelled away from the drum 402. Conversely, from the 3 O'clock position to the 9 O'clock position charge or pole type of the drum 402 could be opposite to the pole of the plate 404 to attract the plate 404 toward the underlying surface of the drum 402.

In examples, one or more of the gears 422, 426, 428, and 430 could be an elliptical gear or other non-circular gears. For instance, the spur gear 430 could be an elliptical gear configured to mesh properly with the ring gear 434 regardless of an angle of rotation of the arm 436. Such an elliptical gear might help compensate for variation of translational speed of the spur gear 422 as it moves from its innermost position to its outermost position as opposed to when it moves from its outermost position to its innermost position. Particularly, the minor diameter of the elliptical gear would mesh with the ring gear 434 at the 9 O'clock position, and the major diameter of the elliptical gear would mesh with the ring gear at the 3 O'clock position.

FIG. 4P illustrates the apparatus of FIGS. 4A-4O having multiple (e.g., eight) plates and associated assemblies, in accordance with an example implementation. Particularly, FIG. 4P illustrates multiple assemblies (e.g., multiple plates 404, multiple rack gears 418, etc.) disposed about the drum 402. Each of these assemblies goes through the same cycle as described above with respect to FIGS. 4A-4O. Each branch, such as the branch 410, of the manifold 408 communicates fluid to a gap that separate a plate of a respective assembly from the drum 402. When the branch has access to fluid in the high pressure section 452A of the inner drum 450, the high pressure fluid 454 is communicated to the gap. However, as the manifold 408 rotates, the branch transitions from having access to fluid in the high pressure section 452A to having access to fluid in the low pressure section 452B. After the transition, fluid in the gap 406 may be low pressure fluid. Having multiple assemblies as shown in FIG. 3P may ensure continuity of motion because at least some of the branches of the manifold 408 have access to the high pressure fluid 454 at any given rotational position of the manifold 408.

In examples, to synchronize meshing of all eight gear trains of the eight assemblies shown in FIG. 4P, anti-backlash gears could be incorporated to accommodate tolerances present in the gear trains due to, for example, fabrication variances. For instance, one or more of the gears 422, 426, 428, and 430 could incorporate a spring-loaded counter rotating gear to prevent binding during rotation.

Rotation of the multiple assemblies shown in FIG. 4P rotate can be utilized, for example, to drive a power source. For example, the bushing 442 could be coupled to a shaft of a power source (e.g., an electric generator, an engine, a turbine, pump, a heart pump, an insulin or medication pump implanted in a body of a patient, etc.). Thus, energy in the pressurized fluid disposed in the gap 406 (and similar gaps of other assemblies) is converted into mechanical motion of the plate 404. As the plate 404 rotates about the underlying surface of the drum 402, volume of fluid in the gap 406 remains substantially the same or changes infinitesimally. Such an infinitesimal volume change accounts for leakage of fluid and any infinitesimal movement of the plate 404 away from the underlying surface of the drum 402 as the plate 404 is repelled away from the underlying surface under fluid pressure. The term "substantially" is used herein to indicate a the fluid volume in the gap 406 remains within a threshold volume value (e.g., fluid volume changes by less than 5%) from an initial fluid volume in the gap 406 as the plate 404 moves along the underlying surface of the drum 402.

In examples, to reduce fluid seepage from the gap 406, a movable adjusting plate could be added or coupled to a bottom of the plate 404 such that the gap 406 is disposed between the plate 404 and the movable adjusting plate. Under fluid pressure, the movable adjusting place may tend to thrust away from the plate 404 toward the underlying surface of the drum 402, while the plate 402 is repelled away from the movable adjusting plate. In another example, rollers may be added at the bottom of the movable adjusting plate so as to reduce friction between the movable adjusting plate and the underlying surface of the drum 402 as the movable adjusting plate coupled to the plate 404 moves along the underlying surface.

Another way to reduce seepage includes incorporating deformable features, coupled to an edge of a perimeter of the plate 404 that would seal the gap 406. Examples of such a deformable feature include a wiper, a series of wipers, a roller, or series of rollers.

FIG. 4Q illustrates telescopic cylinders connecting the manifold 408 to respective plates, in accordance with an example implementation. As shown in FIG. 4Q, there is an eccentricity between the center 449A of the drum 402 and a center of rotation 470 of the manifold 408. The center of rotation 470 is the same as the center 449B of the ring gear 434 shown in FIG. 4G; however, FIG. 4Q is shown from a perspective of the side of the drum 402 where the manifold 408 is mounted. Due to the eccentricity between the center 449A of the drum 402 and the center of rotation 470 of the manifold 408, cylinders (e.g., the cylinder 414) communicating fluid from the inner drum 450 to respective elbows are configured to be telescopic. In other words, each cylinder may have concentric tubular sections designed to slide into one another so as to allow variation in length of the cylinder.

As shown in FIG. 4Q, each of the cylinders communicating fluid to the respective elbows is at a particular state of extension based on where a respective plate is relative to the manifold 408. For instance, cylinder 472 is longer, or is extended more, than the cylinder 414. Each of these cylinders goes through a cycle between a most extended position, i.e., position of cylinder 474, and a least extended position, i.e., position of cylinder 476. Such telescopic configuration of the cylinders accommodates the eccentricity between the center 449A of the drum, and the center of rotation 470 of the manifold 408.

FIG. 4R illustrates geometric relationship between the drum 402, the plate 404, and the ring gear 434, in accordance with an example implementation. The radius of the ring gear 434 is labelled as $R_{rg}$, and the radius of the drum 402 is labelled as $R_d$. The distance between the plate 404 and the ring gear at the 9 O'clock position (i.e., when the spur gear 422 is at its outermost position farthest from the drum 402) is labelled $d_o$. The distance between the plate 404 and the ring gear at the 3 O'clock position (i.e., when the spur gear 422 is at its innermost position closest to the drum 402) is labelled $d_i$.

Thus, the diameter of the ring gear ($D_{rg}$) and the diameter of the drum ($D_d$) can be related as follows:

$$D_g = D_{rg} - (d_o - d_i) \quad (12)$$

Half a circumference ($C_d$) of the drum 402 can be calculated as:

$$\tfrac{1}{2} C_d = 0.5 \cdot \pi \cdot D_d \quad (13)$$

The distance ($L_0$) of the plate 404 from the center 449B of the ring gear 434 when the plate is at the 9 O'clock position can be calculated using the radius $R_{rg}$ of the ring gear as:

$$L_o = R_{rg} - d_o \quad (14)$$

The distance ($L_i$) of the plate 404 from the center 449B of the ring gear 434 when the plate is at the 3 O'clock position can be calculated as:

$$L_i = R_{rg} - d_i \quad (15)$$

A difference in location of the plate 404 relative to the center 449B can thus be calculated as:

$$\Delta = L_i - L_o \quad (16)$$

Thus, as the plate 404 goes through half a rotation about the circumference of the drum 402 from the 9 O'clock position to the 3 O'clock position, the plate 404 changes its location relative to the center 449B by an amount equal to $\Delta$. A ratio R can therefore be calculated as:

$$R = \frac{\Delta}{\left(\frac{1}{2} C_d\right)} \quad (17)$$

The ratio R defines a difference in location of the plate 404 relative to the center 449B between the 9 O'clock position and the 3 O'clock position divided by a circular distance 478 that separates these two locations.

The ratio R can also be calculated using diameters of the gears 422, 426, 428, and 430. Assuming that $D_1$ is a diameter of the gear 422, $D_2$ is a diameter of the gear 426, $D_3$ is a diameter of the gear 428, and $D_4$ is a diameter of the gear 430, the ratio R can also be calculated as:

$$R = \left(\frac{D_1}{D_2}\right)\left(\frac{D_3}{D_4}\right)\left(\frac{D_{rg}}{D_d}\right) \quad (18)$$

Compared to the plate 202 in FIGS. 2A-2B, which follows a linear path as it moves along the inclined surface 220, the plate 404 follows a circular path along the surface of the drum 402. Thus, while an angle like the angle ($\alpha$) shown in FIG. 2A might not be defined for the plate 404, an effective angle can be defined based on the ratio R:

$$\alpha_{\mathit{eff}} = \tan^{-1}(R) = \tan^{-1}\left(\frac{\Delta}{\left(\frac{1}{2} C_d\right)}\right) \quad (19)$$

As an example for illustration, assuming that the Ring gear diameter ($D_{rg}$)=1097.3 millimeter (mm), $d_o$=649.66 mm, and $d_i$=349.671 mm, and using equations (12)-(19), $\alpha_{\mathit{eff}}$ can be calculated as =15.303°, which is the close to the angle $\alpha$ calculated above at equation (3).

d. Unifying the Various Implementations

The apparatuses 200, 300, and 400 work on the same principle. Instead of a fluid volume change as described in FIGS. 1A-1B, the apparatuses 200, 300, 400 operate based on high pressure applied on the surface area of a plate with fluid volume remaining substantially the same. Instead the volume change is mechanical in the form of the travel of the plate (e.g., the plate 202 or 404 or the disk 304) made possible by the gearing configurations. In each of the apparatuses 200, 300, and 400, a moving rack gear (e.g., the rack gears 204, 310, and 418) intersects with a surface on which the plate travels, thus establishing the travel distance of the plate while it is under pressure.

Thus, each implementation comprises an element (e.g., a plate) being repelled under fluid pressure from an underlying surface, thus setting in motion a gearing mechanism that ultimately leads to the element itself moving along the underlying surface without a substantial change in fluid volume. A unifying equation can describe all these implementations. This equation relates an arm travel, a plate travel, and a gear ratio. The equation can be expressed as:

$$\text{Gear Ratio (R)} = \left(\frac{\text{Arm Travel}}{\text{Plate Travel}}\right) \quad (20)$$

The term "plate" is used in equation (20) to include any element similar to the plate 202 or 404 or the disk 304. The gear ratio can also be expressed as a ratio of an input displacement of an arm to an output displacement of the plate. Arm travel is a total distance that the arm moves between an extended position and a retracted position. The plate travel is a total distance that the plate travels as the arm traverses its total travel distance.

In the case of the apparatus 200, the arm travel is expressed in equation (1) as the distance $\Delta y$ travelled by the vertical rack gear 204, and the plate travel is the distance $\Delta x$ travelled by the plate 202. The gear ratio for the apparatus 100 is also defined by equation (1). In the case of the apparatus 300, the arm travel is expressed by the displacement $\Delta H$ defined in equation (4), and the plate travel is defined in equation (10) by the term "Disk Travel." An effective gear ratio R for the apparatus 300 is expressed above by equation (11). For the apparatus 400, the arm travel is expressed by the term $\Delta$ defined by equation (16), and the plate travel is half the circumference of the drum 402 as defined by equation (13). The gear ratio for the apparatus 400 is expressed by equation (17).

In each case, the gear ratio could also be calculated from the specific gear train (i.e., diameters of the various gears) associated with each apparatus as expressed by equations (1), (11), and (18). The unifying equation (20) illustrates that these various apparatuses are based on the same principle. Thus, other apparatuses or systems that involve this same principle are contemplated herein.

It is noted that spur gears have been used throughout this disclosure as examples of gear types that could be used. However, other gear types (e.g., helical, bevel, rack and pinion, worm, etc.) could be used in the apparatuses 200, 300, and 400 as well.

III. CONCLUSION

It should be understood that arrangements described herein are for purposes of example only. As such, those skilled in the art will appreciate that other arrangements and other elements (e.g., machines, interfaces, orders, and groupings of operations, etc.) can be used instead, and some elements may be omitted altogether according to the desired results.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

What is claimed is:

1. An apparatus comprising:
   a plate configured to move along an underlying surface via a layer of pressurized fluid disposed in a gap between the plate and the underlying surface;
   a first rack gear coupled to the plate and meshing with a first gear, wherein the first rack gear is movable with the plate; and
   a second rack gear meshing with a second gear, wherein the second rack gear is fixed, and wherein the second gear is coupled to the first gear, wherein
   the pressurized fluid in the gap repels the plate away from the underlying surface, thereby causing (i) the first rack gear to move linearly and the first gear to rotate, (ii) the second gear to rotate and move along the second rack gear, and (iii) the plate to move along the underlying surface.

2. The apparatus of claim 1, wherein a volume of fluid disposed in the gap remains substantially constant as the plate moves along the underlying surface.

3. The apparatus of claim 1, wherein the underlying surface is an inclined surface, and wherein a tangent of an angle of inclination of the inclined surface is equal to a ratio between pitch diameter of the first gear and pitch diameter of the second gear.

4. The apparatus of claim 1, wherein the first gear and the second gear form a compound gear such that both gears rotate at a particular speed.

5. The apparatus of claim 1, wherein the underlying surface is a surface of a cylindrical drum, and wherein the plate is configured to rotate about the surface of the cylindrical drum.

6. The apparatus of claim 5, wherein the second rack gear is a ring gear, and wherein the second gear is configured to engage external teeth of the ring gear and rotate about the ring gear as the plate rotates about the surface of the cylindrical drum.

7. The apparatus of claim 5, wherein the first gear is coupled to the second gear via a gear train such that (i) the first gear is coupled to a third gear via a first shaft, (ii) the third gear is configured to mesh with a fourth gear, wherein the fourth gear is coupled to the second gear via a second shaft.

8. The apparatus of claim 1, further including:
   a channel disposed in the plate, wherein the pressurized fluid flows through the channel to the gap to form the layer of pressurized fluid.

9. An apparatus comprising:
   a plate configured to rotate about an underlying surface of a cylindrical drum via a layer of pressurized fluid disposed in a gap between the plate and the underlying surface;
   a rack gear coupled to the plate and meshing with a first gear, wherein the rack gear is configured to rotate with the plate as the plate rotates about the underlying surface of the cylindrical drum; and
   a ring gear meshing with a second gear, wherein the ring gear is fixed and has external teeth meshing with teeth of the second gear, and wherein the second gear is coupled to the first gear, wherein
   the pressurized fluid in the gap repels the plate away from the underlying surface of the cylindrical drum, thereby causing (i) the rack gear to extend away from the underlying surface and the first gear to rotate, (ii) the second gear to rotate and move along the ring gear, and (iii) the plate, the rack gear, the first gear, and the second gear to rotate about the underlying surface.

10. The apparatus of claim 9, wherein a volume of fluid disposed in the gap remains substantially constant as the plate rotates about the underlying surface of the cylindrical drum.

11. The apparatus of claim 9, wherein the first gear is coupled to the second gear via a gear train such that (i) the first gear is coupled to a third gear via a first shaft, (ii) the third gear is configured to mesh with a fourth gear, wherein the fourth gear is coupled to the second gear via a second shaft.

12. The apparatus of claim 9, further including:
   a manifold mounted on one side of the cylindrical drum, wherein:
   the manifold is configured to rotate with the plate,
   the manifold is coupled to a source of high pressure fluid and a source of low pressure fluid having fluid at a pressure less than respective pressure of the high pressure fluid, and
   the manifold is configured to alternate between providing the high pressure fluid and the low pressure fluid to the gap as the manifold rotates.

13. The apparatus of claim 12, wherein the manifold includes a pipe configured to provide fluid to the gap, wherein the pipe is exposed to the high pressure fluid during a portion of a rotation of the manifold and exposed to the low pressure fluid during another portion of the rotation of the manifold, enabling the manifold to provide fluid at alternating pressure to the gap.

14. The apparatus of claim 12, wherein the manifold is offset from a center of the one side of the cylindrical drum on which the manifold is mounted, wherein as the plate rotates about the surface, a distance between the manifold and the plate varies due to the offset of the manifold from the center of the one side of the cylindrical drum, and wherein the apparatus further includes:
   a telescopic cylinder configured to provide the pressurized fluid from the manifold to the gap, wherein the telescopic cylinder has concentric tubular sections designed to slide into one another such that the telescopic cylinder varies in length to accommodate variation in the distance between the manifold and the plate.

15. The apparatus of claim 14, wherein the plate includes a channel configured to receive the pressurized fluid via the telescopic cylinder and deliver the pressurized fluid to the gap to form the layer of pressurized fluid.

16. The apparatus of claim 9, wherein the plate is coupled to a cylindrical elbow at a first side of the plate opposite to a second side interfacing with the underlying surface of the cylindrical drum, wherein the rack gear is coupled to the cylindrical elbow, and wherein the cylindrical elbow includes one or more channels configured to communicate fluid to corresponding channels in the plate so as to deliver fluid to the gap.

17. The apparatus of claim 16, wherein the rack gear is coupled to the cylindrical elbow and configured to rotate about a surface of the cylindrical elbow relative to the plate as the plate and the rack gear rotate about the underlying surface of the cylindrical drum.

18. The apparatus of claim 9, wherein the rack gear comprises a structure having a first inner surface and a second inner surface opposite the first inner surface, wherein the first inner surface includes gear teeth and the second inner surface includes respective gear teeth, such that the first gear is disposed within the structure between the first inner surface and the second inner surface.

19. The apparatus of claim 18, wherein the cylindrical drum is disposed eccentrically relative to the ring gear, wherein as the plate rotates about the underlying surface of the cylindrical drum, the second gear remains engaged with the ring gear, and the first gear is configured to translate within the structure of the rack gear between the first inner surface and the second inner surface so as to accommodate eccentric disposition of the cylindrical drum relative to the ring gear.

20. The apparatus of claim 18, wherein:
the gear teeth of the first inner surface are hinged such that the gear teeth of the first inner surface engage respective teeth of the first gear while the first gear translates within the structure of the rack gear in a first direction, while being passive as the first gear translates within the structure of the rack gear in a second direction opposite to the first direction, and
the gear teeth of the second inner surface are hinged such that the gear teeth of the second inner surface engage the respective teeth of the first gear while the first gear translates within the structure of the rack gear in the second direction, while being passive as the first gear translates within the structure of the rack gear in the first direction.

21. The apparatus of claim 9, wherein the plate is one plate among a plurality of plates disposed about the underlying surface of the cylindrical drum, each plate of the plurality of plates being coupled to a respective assembly including a respective rack gear, a respective first gear, and a respective second gear configure to rotate about the ring gear.

22. An apparatus comprising:
a first disk having a hole disposed therein, wherein a portion of the first disk that includes the hole is exposed to pressurized fluid;
a first shaft coupled to a center of the first disk;
a second disk disposed in the hole of the first disk;
a first rack gear coupled to the second disk at a first end of the first rack gear, and configured to mesh with a first gear at a second end of the first rack gear;
a second gear coupled to the first gear via a second shaft, wherein the second gear is configured to rotate with the first gear at a particular speed, and wherein the second shaft is configured to couple the first gear and the second gear to the first shaft; and
a second rack gear meshing with the second gear, wherein the second rack gear is fixed, wherein
the pressurized fluid repels the second disk disposed within the first disk, thereby causing (i) the first rack gear to move linearly and the first gear to rotate, (ii) the second gear to rotate and move along the second rack gear that is fixed, and (iii) the first shaft and the first disk coupled thereto to rotate.

23. The apparatus of claim 22, wherein the second disk is one disk among a plurality of disks disposed within the first disk, wherein each disk of the plurality of disks is coupled to a respective first rack gear.

24. The apparatus of claim 23, wherein at a given rotational position of the first disk, a first subset of the plurality of disks is included within the portion of the first disk exposed to the pressurized fluid and a second subset of the plurality of disks is included within a remaining portion of the first disk.

25. The apparatus of claim 22, further including:
a transition wiper coupled to the first disk and configured to wipe fluid off of the second disk as the first disk rotates and the second disk transitions away from the portion exposed to the pressurized fluid.

26. The apparatus of claim 22, further including:
a complementary first disk disposed parallel to the first disk, wherein the complementary first disk includes a complementary hole disposed therein, wherein a portion of the complementary first disk is exposed to the pressurized fluid, wherein the first shaft coupled to the center of the first disk is coupled to a complementary center of the complementary first disk, such that the first disk and the complementary first disk are configured to rotate together at a particular speed; and
a complementary second disk disposed in the hole of the complementary first disk, wherein the complementary second disk is coupled to the first rack gear meshing with the first gear, wherein as the first disk and the complementary first disk rotate, the second disk transitions away from the pressurized fluid, and the complementary second disk transitions into being exposed to the pressurized fluid, wherein
the pressurized fluid repels the complementary second disk disposed within the complementary first disk, thereby causing (i) the first rack gear to move linearly and the first gear to rotate, (ii) the second gear to rotate and move along the second rack gear that is fixed, and (iii) the first shaft, the first disk, and the complementary first disk to rotate.

27. The apparatus of claim 26, wherein the second rack gear is disposed between the first disk and the complementary first disk, wherein the second rack gear has a first portion having gear teeth facing toward the first disk and a second portion having complementary gear teeth facing toward the complementary first disk.

28. The apparatus of claim 26, wherein the second rack gear is disposed between the first disk and the complementary first disk, wherein the second rack gear is split into two parts, wherein gear teeth of a first part of the two parts face toward the first disk, and wherein complementary gear teeth of a second part of the two parts face toward the complementary first disk.

* * * * *